US012608372B2

(12) United States Patent
Crabtree et al.

(10) Patent No.: US 12,608,372 B2
(45) Date of Patent: Apr. 21, 2026

(54) SYSTEM AND METHOD FOR AUTOMATED ANALYSIS OF LEGAL DOCUMENTS WITHIN AND ACROSS SPECIFIC FIELDS

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/597,955

(22) Filed: Mar. 7, 2024

(65) Prior Publication Data

US 2024/0211473 A1     Jun. 27, 2024

Related U.S. Application Data

(63) Continuation of application No. 18/191,876, filed on Mar. 29, 2023, which is a continuation of application No. 17/084,263, filed on Oct. 29, 2020, now Pat. No. 11,687,527, which is a continuation-in-part of application No. 16/864,133, filed on Apr. 30, 2020, now Pat. No. 11,494,665, which is a continuation-in-part of application No. 15/847,443, filed on Dec. 19, 2017, now abandoned, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now (Continued)

(51) Int. Cl.
| | |
|---|---|
| *G06F 16/24* | (2019.01) |
| *G06F 16/245* | (2019.01) |
| *G06F 16/248* | (2019.01) |
| *G06F 16/901* | (2019.01) |
| *G06F 40/30* | (2020.01) |
| *G06N 5/04* | (2023.01) |

(52) U.S. Cl.
CPC .......... *G06F 16/245* (2019.01); *G06F 16/248* (2019.01); *G06F 16/9024* (2019.01); *G06F 40/30* (2020.01); *G06N 5/04* (2013.01)

(58) Field of Classification Search
None
See application file for complete search history.

(56) References Cited

U.S. PATENT DOCUMENTS

| | | | |
|---|---|---|---|
| 6,256,544 B1 | 7/2001 | Weissinger | |
| 7,113,956 B1 * | 9/2006 | Elias | G06N 5/022 707/999.102 |

(Continued)

FOREIGN PATENT DOCUMENTS

| | | |
|---|---|---|
| WO | 0163534 A2 | 8/2001 |
| WO | 2014159150 A1 | 10/2014 |

(Continued)

*Primary Examiner* — Kavita Stanley
*Assistant Examiner* — Cao D Vuong
(74) *Attorney, Agent, or Firm* — Galvin Patent Law LLC; Brian R. Galvin

(57) ABSTRACT

Automated analysis of legal documents within and across different fields is disclosed. An extraction processor identifies and extracts knowledge from data contained in documents and transforms it into a common data form. An analysis processor develops local and global knowledge graphs containing the key entities, relationships and concepts encoded in the text.

14 Claims, 17 Drawing Sheets

Related U.S. Application Data abandoned, which is a continuation-in-part of application No. 14/925,974, filed on Oct. 28, 2015, now abandoned, said application No. 15/790,327 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/847,443 is a continuation-in-part of application No. 15/489,716, filed on Apr. 17, 2017, now abandoned, which is a continuation-in-part of application No. 15/409,510, filed on Jan. 18, 2017, now abandoned, which is a continuation-in-part of application No. 15/379,899, filed on Dec. 15, 2016, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962.

(60) Provisional application No. 62/568,291, filed on Oct. 4, 2017, provisional application No. 62/568,298, filed on Oct. 4, 2017.

(56) References Cited

U.S. PATENT DOCUMENTS

| 7,534,950 B2 | 5/2009 | Lyles |
| 7,693,812 B2 | 4/2010 | Lim et al. |

| 8,156,029 B2 | 4/2012 | Szydlo | |
| 8,335,754 B2 | 12/2012 | Dawson et al. | |
| 8,352,347 B2 | 1/2013 | Howard et al. | |
| 8,612,208 B2 | 12/2013 | Cooper et al. | |
| 8,666,922 B2 | 3/2014 | Hohimer et al. | |
| 8,930,178 B2 * | 1/2015 | Pestian | G16H 70/60 |
| | | | 704/10 |
| 9,129,038 B2 * | 9/2015 | Begel | G06F 8/74 |
| 9,189,509 B1 | 11/2015 | Tsypliaev et al. | |
| 9,348,815 B1 * | 5/2016 | Estes | G06F 40/40 |
| 9,697,475 B1 | 7/2017 | Subramanya et al. | |
| 9,785,696 B1 | 10/2017 | Yakhnenko et al. | |
| 9,798,829 B1 | 10/2017 | Baisley | |
| 10,057,775 B2 | 8/2018 | Raleigh et al. | |
| 10,430,712 B1 | 10/2019 | Reed | |
| 10,534,863 B2 | 1/2020 | Song et al. | |
| 10,810,193 B1 | 10/2020 | Subramanya et al. | |
| 11,126,793 B2 | 9/2021 | Gkotsoulia et al. | |
| 11,144,725 B2 | 10/2021 | Luo | |
| 11,205,052 B2 | 12/2021 | Sapugay et al. | |
| 11,397,897 B2 | 7/2022 | Ameri | |
| 11,468,054 B2 | 10/2022 | Chaudhuri et al. | |
| 2007/0012161 A1 | 1/2007 | Lyles | |
| 2007/0168370 A1 | 7/2007 | Hardy | |
| 2008/0172353 A1 | 7/2008 | Lim et al. | |
| 2010/0228693 A1 | 9/2010 | Dawson et al. | |
| 2013/0041921 A1 | 2/2013 | Cooper et al. | |
| 2014/0040975 A1 | 2/2014 | Raleigh et al. | |
| 2014/0074826 A1 | 3/2014 | Cooper et al. | |
| 2014/0195897 A1 * | 7/2014 | Balinsky | G06F 40/106 |
| | | | 715/254 |
| 2015/0310129 A1 | 10/2015 | Ushijima | |
| 2016/0042296 A1 * | 2/2016 | Shan | G06N 5/022 |
| | | | 706/11 |
| 2016/0042299 A1 * | 2/2016 | Liang | G06F 16/24578 |
| | | | 706/12 |
| 2016/0275123 A1 | 9/2016 | Lin et al. | |

FOREIGN PATENT DOCUMENTS

| WO | 2015094545 A1 | 6/2015 |
| WO | 2017075543 A1 | 5/2017 |

* cited by examiner

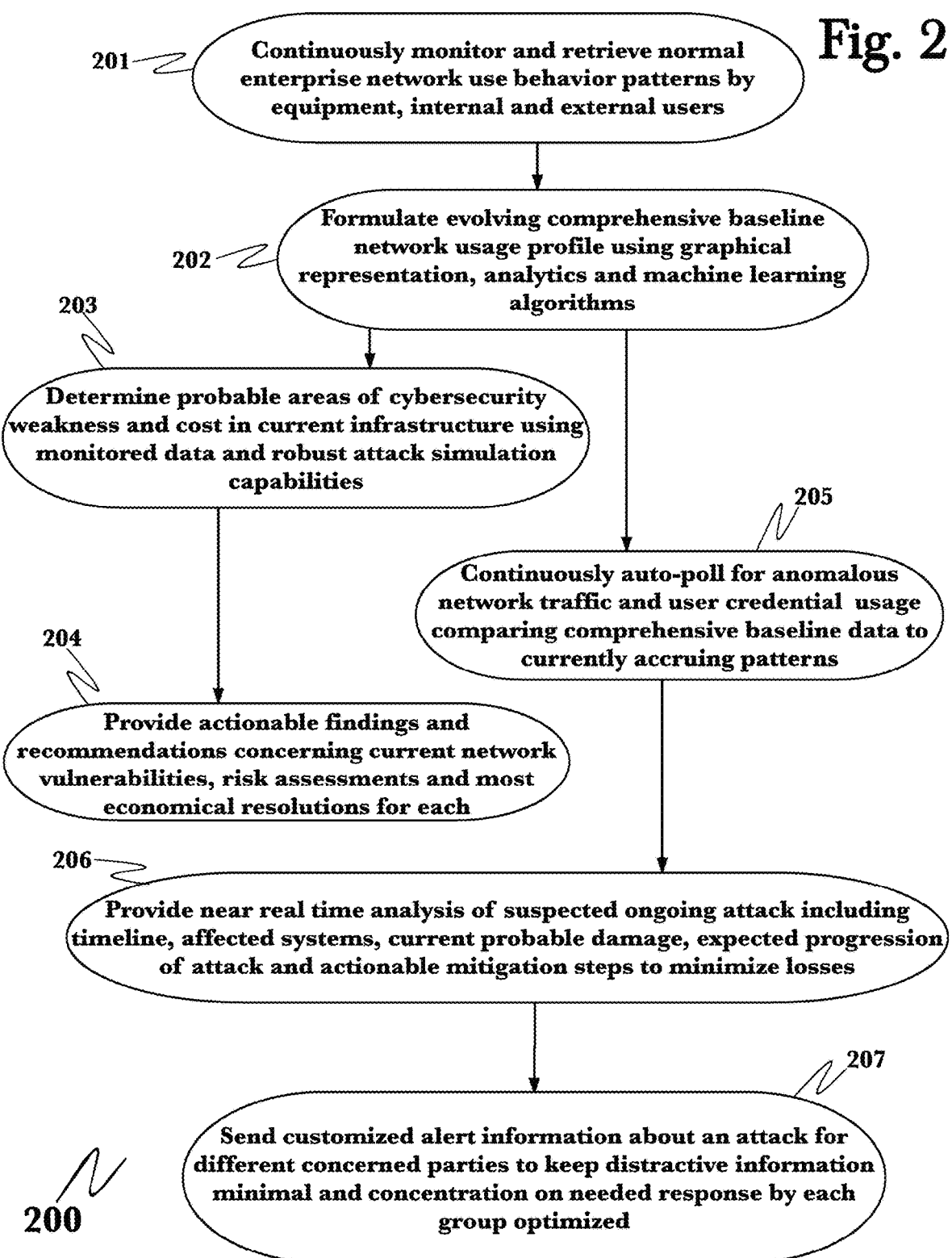

Fig. 2

201 — Continuously monitor and retrieve normal enterprise network use behavior patterns by equipment, internal and external users 202 — Formulate evolving comprehensive baseline network usage profile using graphical representation, analytics and machine learning algorithms 203 — Determine probable areas of cybersecurity weakness and cost in current infrastructure using monitored data and robust attack simulation capabilities 205 — Continuously auto-poll for anomalous network traffic and user credential usage comparing comprehensive baseline data to currently accruing patterns 204 — Provide actionable findings and recommendations concerning current network vulnerabilities, risk assessments and most economical resolutions for each 206 — Provide near real time analysis of suspected ongoing attack including timeline, affected systems, current probable damage, expected progression of attack and actionable mitigation steps to minimize losses 207 — Send customized alert information about an attack for different concerned parties to keep distractive information minimal and concentration on needed response by each group optimized

200

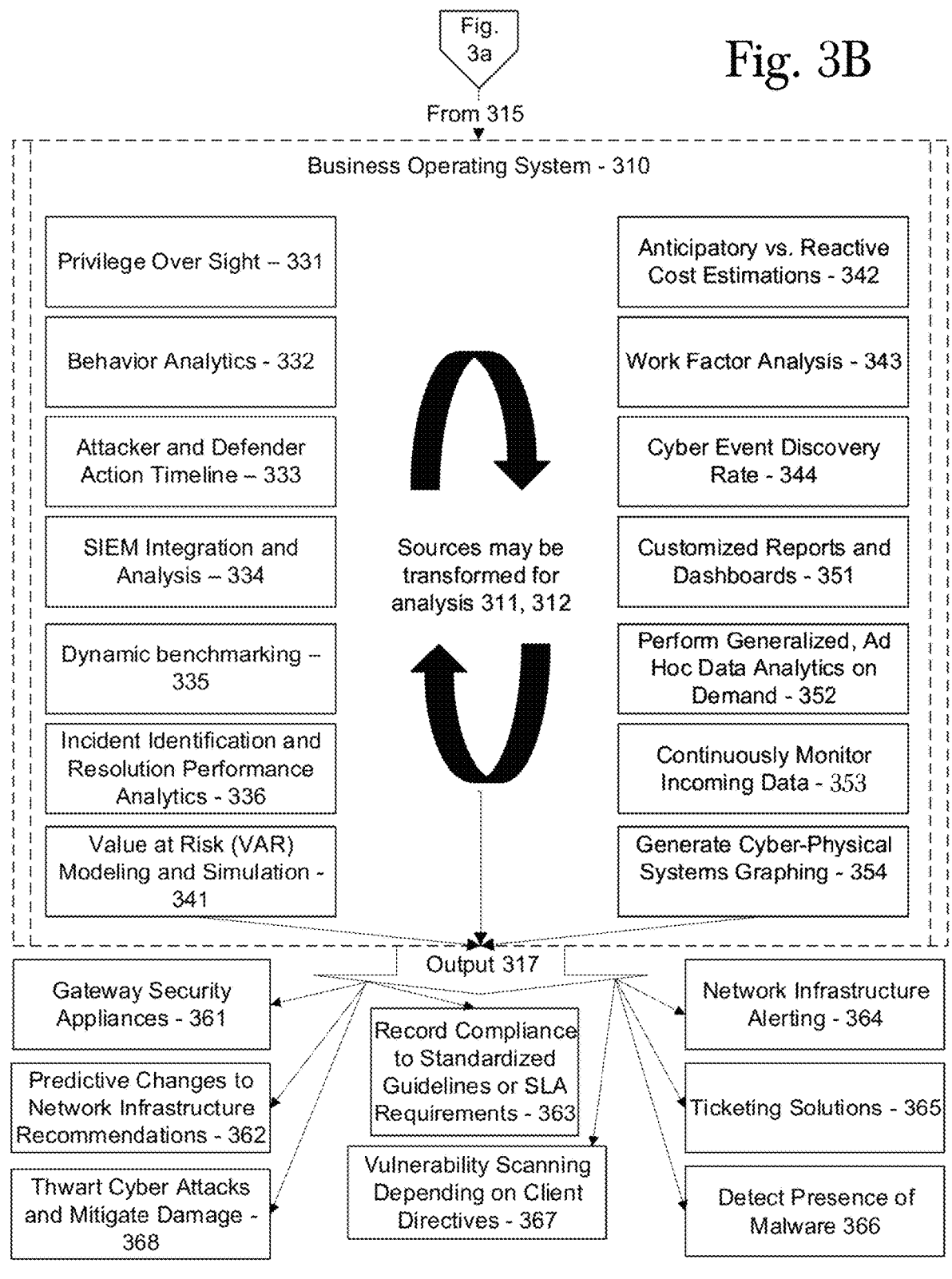

Fig.
3a

From 315

Fig. 3B

Business Operating System - 310

Privilege Over Sight – 331

Behavior Analytics - 332

Attacker and Defender Action Timeline – 333

SIEM Integration and Analysis – 334

Dynamic benchmarking – 335

Incident Identification and Resolution Performance Analytics - 336

Value at Risk (VAR) Modeling and Simulation - 341

Sources may be transformed for analysis 311, 312

Anticipatory vs. Reactive Cost Estimations - 342

Work Factor Analysis - 343

Cyber Event Discovery Rate - 344

Customized Reports and Dashboards - 351

Perform Generalized, Ad Hoc Data Analytics on Demand - 352

Continuously Monitor Incoming Data - 353

Generate Cyber-Physical Systems Graphing - 354

Output 317

Gateway Security Appliances - 361

Predictive Changes to Network Infrastructure Recommendations - 362

Thwart Cyber Attacks and Mitigate Damage - 368

Record Compliance to Standardized Guidelines or SLA Requirements - 363

Vulnerability Scanning Depending on Client Directives - 367

Network Infrastructure Alerting - 364

Ticketing Solutions - 365

Detect Presence of Malware 366

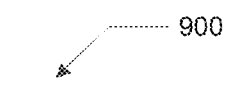

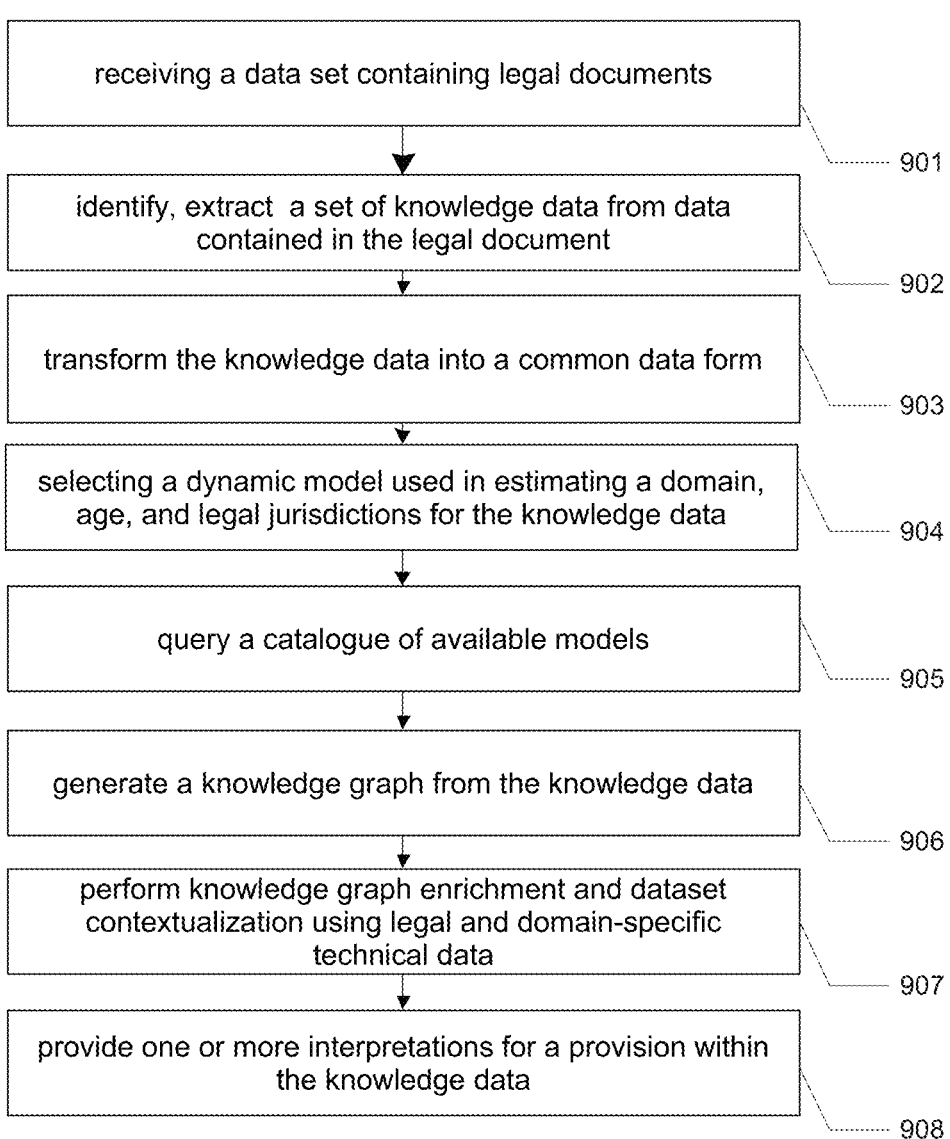

— 900 receiving a data set containing legal documents

— 901 identify, extract a set of knowledge data from data contained in the legal document

— 902 transform the knowledge data into a common data form

— 903 selecting a dynamic model used in estimating a domain, age, and legal jurisdictions for the knowledge data

— 904 query a catalogue of available models

— 905 generate a knowledge graph from the knowledge data

— 906 perform knowledge graph enrichment and dataset contextualization using legal and domain-specific technical data

— 907 provide one or more interpretations for a provision within the knowledge data

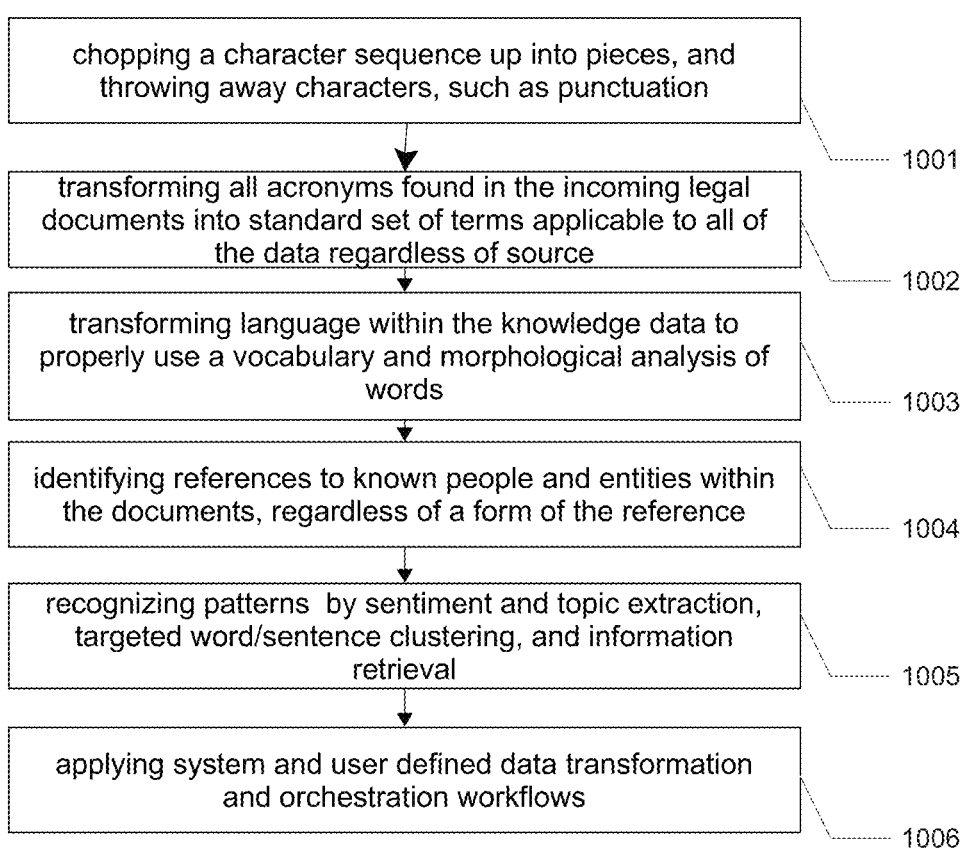

| |
|---|
| chopping a character sequence up into pieces, and throwing away characters, such as punctuation |

1001

| |
|---|
| transforming all acronyms found in the incoming legal documents into standard set of terms applicable to all of the data regardless of source |

1002

| |
|---|
| transforming language within the knowledge data to properly use a vocabulary and morphological analysis of words |

1003

| |
|---|
| identifying references to known people and entities within the documents, regardless of a form of the reference |

1004

| |
|---|
| recognizing patterns by sentiment and topic extraction, targeted word/sentence clustering, and information retrieval |

1005

| |
|---|
| applying system and user defined data transformation and orchestration workflows |

| Memory 25 | Storage 26 | Outputs 27 | Inputs 28 |
|---|---|---|---|

20

| Processors 21 | OSes 22 | Services 23 | Clients 24 |
|---|---|---|---|

Fig. 12

SYSTEM AND METHOD FOR AUTOMATED ANALYSIS OF LEGAL DOCUMENTS WITHIN AND ACROSS SPECIFIC FIELDS

CROSS-REFERENCE TO RELATED APPLICATIONS

Priority is claimed in the application data sheet to the following patents or patent applications, each of which is expressly incorporated herein by reference in its entirety:
Ser. No. 18/191,876
Ser. No. 17/084,263
Ser. No. 16/864,133
Ser. No. 15/847,443
Ser. No. 15/790,457
Ser. No. 15/790,327
62/568,291
Ser. No. 15/616,427
Ser. No. 14/925,974
Ser. No. 15/141,752
Ser. No. 15/091,563
Ser. No. 14/986,536
62/568,298
Ser. No. 15/489,716
Ser. No. 15/409,510
Ser. No. 15/379,899
Ser. No. 15/376,657
Ser. No. 15/237,625
Ser. No. 15/206,195
Ser. No. 15/186,453
Ser. No. 15/166,158

BACKGROUND OF THE INVENTION

Field of the Art

The disclosure relates to the field of computer technology, more specifically to the field of computer architectures for enterprise data collection, analysis, and transmission to cloud-based services.

Discussion of the State of the Art

Legal document analysis within and across specific fields presents a tremendous challenge for applied utilization of artificial intelligence (AI) and machine learning (ML) tools based on the hyper-specialized nomenclature and concepts which may also have substantial superficial similarity but in-fact represent unique concepts across different applications of the law. Current techniques which are commonly employed to legal text analysis often over-generalize or overfit models without adequate consideration of specialized areas of the law. Distinct subspecialties employ their own parochial lexicons with highly contextualized semantics that may not be well understood even by other legal practitioners (e.g. a corpus of legal notes generated by contract lawyers may not be suitable training data for automating processing of notes generated by criminal litigators). Many of these concepts are also apposite for other specialized fields such as engineering or medicine where nomenclature and meaning can be quite distinct within sub-specialties; medicine in particular is known for the specificity required in building Natural Language Processing (NLP) models with limited transferability to other (even related) specializations.

SUMMARY OF THE INVENTION

Accordingly, the inventor has conceived and reduced to practice, a system and method for automated analysis of legal documents within and across different fields. A system for automated analysis of legal documents within and across different fields is disclosed. The system includes a computer system comprising at least one memory, at least one processor, and at least a first plurality of programming instructions stored in the at least one memory and operating on the at least one processor configured to allow the operation on the computer system of additional programming instructions, an extraction processor, comprising at least a second plurality of programming instructions stored in the at least one memory of, and operating on at least one processor of, the computer system, and an analysis processor, comprising at least a second plurality of programming instructions stored in the at least one memory of, and operating on at least one processor of, the computer system. The second plurality of programming instructions, when operating on the at least one processor, cause the computer system to receive a data set containing legal documents, perform a set of systematic NLP-based data extraction generic micro-functions to identify, extract a set of knowledge data from data contained in the legal document, and transform the knowledge data into a common data form. The second plurality of programming instructions, when operating on the at least one processor, cause the computer system to perform dynamic model selection based on a series classification algorithms estimating a domain, age, and legal jurisdictions for the knowledge data, effectively query a catalogue of available models generate a knowledge graph from the knowledge data; perform knowledge graph enrichment and dataset contextualization using legal and domain-specific technical data, and using knowledge data to provide one or more interpretations for a provision within the knowledge data.

According to a preferred embodiment, a computing system for automated analysis of legal documents within and across different fields employing a cyber decision platform, the computing system comprising: one or more hardware processors configured for: receiving a data set containing legal documents; performing a set of systematic NLP-based data extraction single-purpose generic micro-functions to identify, extract a set of knowledge data from data contained in the legal document; transforming the knowledge data into a common data form; performing dynamic model selection based on classification algorithms estimating a domain, age, and legal jurisdictions for the knowledge data; querying a catalogue of available models; generating a knowledge graph from the knowledge data; performing knowledge graph enrichment and dataset contextualization using legal and domain-specific technical data; and providing one or more interpretations for a provision within the knowledge data.

According to another preferred embodiment, a computer-implemented method executed on a cyber decision platform for automated analysis of legal documents within and across different fields, the computer-implemented method comprising: receiving a data set of legal documents; identifying and extracting a set of knowledge data from data contained in the legal document; transforming the knowledge data into a common data form; selecting a dynamic model used in estimating a domain, age, and legal jurisdictions for the knowledge data; querying a catalogue of available models; generating a knowledge graph from the knowledge data; performing knowledge graph enrichment and dataset contextualization using legal and domain-specific technical data; and providing one or more interpretations for a provision within the knowledge data.

According to another preferred embodiment, a system for automated analysis of legal documents within and across different fields employing a cyber decision platform, comprising one or more processors with executable instructions that, when executed, cause the system to: receive a data set containing legal documents; perform a set of systematic NLP-based data extraction single-purpose generic micro-functions to identify, extract a set of knowledge data from data contained in the legal document; transform the knowledge data into a common data form; perform dynamic model selection based on classification algorithms estimating a domain, age, and legal jurisdictions for the knowledge data; query a catalogue of available models; generate a knowledge graph from the knowledge data; perform knowledge graph enrichment and dataset contextualization using legal and domain-specific technical data; and provide one or more interpretations for a provision within the knowledge data.

According to another preferred embodiment, non-transitory, computer-readable storage media having computer-executable instructions embodied thereon that, when executed by one or more processors of a computing system employing a cyber decision platform, cause the computing system to: receive a data set containing legal documents; perform a set of systematic NLP-based data extraction single-purpose generic micro-functions to identify, extract a set of knowledge data from data contained in the legal document; transform the knowledge data into a common data form; perform dynamic model selection based on classification algorithms estimating a domain, age, and legal jurisdictions for the knowledge data; query a catalogue of available models; generate a knowledge graph from the knowledge data; perform knowledge graph enrichment and dataset contextualization using legal and domain-specific technical data; and provide one or more interpretations for a provision within the knowledge data.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

FIG. 2 is a flow diagram of an exemplary function of the business operating system in the detection and mitigation of predetermining factors leading to and steps to mitigate ongoing cyberattacks.

FIGS. 3A and 3B are a process diagram showing a general flow 300 of business operating system functions in use to mitigate cyberattacks.

FIG. 9 is a process diagram illustrating an exemplary method 800 for automated analysis of legal documents within and across different fields, according to aspect.

FIG. 10 is a process diagram illustrating an exemplary method 900 for automated analysis of legal documents within and across different fields, according to aspect.

FIG. 12 is a block diagram illustrating an exemplary logical architecture for a client device.

DETAILED DESCRIPTION OF THE INVENTION

Figure 1:
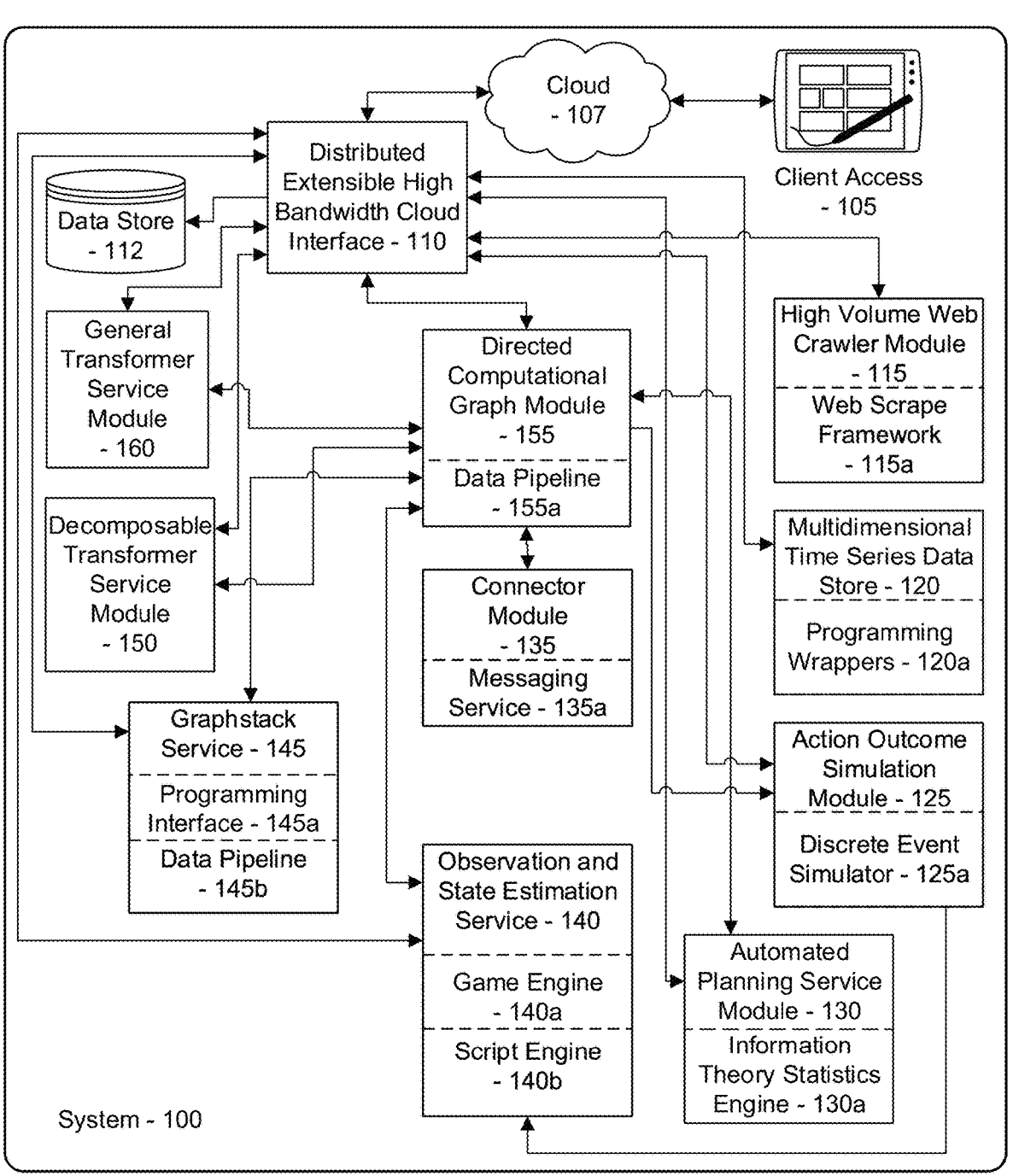
FIG. 1 is a diagram of an exemplary architecture of an advanced cyber decision platform according to one aspect.

The inventor has conceived, and reduced to practice, automated analysis of legal documents within and across different fields.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

"Neural network" as used herein means a computational model, architecture, or system made up of a number of simple, highly interconnected processing elements which process information by their dynamic state response to external inputs, and is thus able to "learn" information by recognizing patterns or trends. Neural networks, also sometimes known as "artificial neural networks" are based on our understanding of the structure and functions of biological neural networks, such as the brains of mammals. A neural network is a framework for application of machine learning algorithms.

Conceptual Architecture

FIG. 1 is a diagram of an exemplary architecture of an advanced cyber decision platform (ACDP) 100 according to one aspect. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information via network 107 and operates a data store 112 such as, but not limited to MONGODB™, COUCHDB™, CASSANDRA™ or REDIS™ according to various arrangements. Much of the business data analyzed by the system both from sources within the confines of the client business, and from cloud based sources, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145*a*, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145*a* and stores it in a graph-based data store 145*b* such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130*a* based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125*a* coupled with the end user facing observation and state estimation service 140 which is highly scriptable 140*b* as circumstances require and has a game engine 140*a* to more realistically stage possible outcomes of business decisions under consideration, allows business decision makers to investigate the probable outcomes of choosing one pending course of action over another based upon analysis of the current available data.

For example, the Information Assurance department is notified by the system 100 that principal X is using credentials K (Kerberos Principal Key) never used by it before to access service Y. Service Y utilizes these same credentials to access secure data on data store Z. This correctly generates an alert as suspicious lateral movement through the network and will recommend isolation of X and Y and suspension of K based on continuous baseline network traffic monitoring by the multidimensional time series data store 120 programmed to process such data 120*a*, rigorous analysis of the network baseline by the directed computational graph 155 with its underlying general transformer service module 160 and decomposable transformer service module 150 in conjunction with the AI and primed machine learning capabilities 130*a* of the automated planning service module 130 which had also received and assimilated publicly available from a plurality of sources through the multi-source connection APIs of the connector module 135. Ad hoc simulations of these traffic patterns are run against the baseline by the action outcome simulation module 125 and its discrete event simulator 125*a* which is used here to determine probability space for likelihood of legitimacy. The system 100, based on this data and analysis, was able to detect and recommend mitigation of a cyberattack that represented an existential threat to all business operations, presenting, at the time of the attack, information most needed for an actionable plan to human analysts at multiple levels in the mitigation and remediation effort through use of the observation and state estimation service 140 which had also been specifically preprogrammed to handle cybersecurity events 140*b*.

According to one aspect, the advanced cyber decision platform, a specifically programmed usage of the business operating system, continuously monitors a client enterprise's normal network activity for behaviors such as but not limited to normal users on the network, resources accessed by each user, access permissions of each user, machine to machine traffic on the network, sanctioned external access to the core network and administrative access to the network's identity and access management servers in conjunction with real-time analytics informing knowledge of cyberattack methodology. The system then uses this information for two purposes: First, the advanced computational analytics and simulation capabilities of the system are used to provide immediate disclosure of probable digital access points both at the network periphery and within the enterprise's information transfer and trust structure and recommendations are given on network changes that should be made to harden it prior to or during an attack. Second, the advanced cyber decision platform continuously monitors the network in real-time both for types of traffic and through techniques such as deep packet inspection for pre-decided analytically significant deviation in user traffic for indications of known cyberattack vectors such as, but not limited to, ACTIVE DIRECTORY™/Kerberos pass-the-ticket attack, ACTIVE DIRECTORY™/Kerberos pass-the-hash attack and the related ACTIVE DIRECTORY™/Kerberos overpass-the-hash attack, ACTIVE DIRECTORY™/Kerberos Skeleton Key, ACTIVE DIRECTORY™/Kerberos golden and silver ticket attack, privilege escalation attack, compromised user credentials, and ransomware disk attacks. When suspicious activity at a level signifying an attack (for example, including but not limited to skeleton key attacks, pass-the-hash attacks, or attacks via compromised user credentials) is determined, the system issues action-focused alert information to all predesignated parties specifically tailored to their roles in attack mitigation or remediation and formatted to provide predictive attack modeling based upon historic, current, and contextual attack progression analysis such that human decision makers can rapidly formulate the most effective courses of action at their levels of responsibility in command of the most actionable information with as little distractive data as possible. The system then issues defensive measures in the most actionable form to end the attack with the least possible damage and exposure. All attack data are persistently stored for later forensic analysis.

FIG. 2 is a flow diagram of an exemplary function of the business operating system in the detection and mitigation of predetermining factors leading to and steps to mitigate ongoing cyberattacks 200. The system continuously retrieves network traffic data 201 which may be stored and preprocessed by the multidimensional time series data store 120 and its programming wrappers 120*a*. All captured data are then analyzed to predict the normal usage patterns of network nodes such as internal users, network connected systems and equipment and sanctioned users external to the enterprise boundaries for example off-site employees, contractors and vendors, just to name a few likely participants. Of course, normal other network traffic may also be known to those skilled in the field, the list given is not meant to be exclusive and other possibilities would not fall outside the design of the invention. Analysis of network traffic may include graphical analysis of parameters such as network item to network usage using specifically developed programming in the graph stack service 145, 145*a*, analysis of usage by each network item may be accomplished by specifically pre-developed algorithms associated with the directed computational graph module 155, general transformer service module 160 and decomposable service module 150, depending on the complexity of the individual usage profile 201. These usage pattern analyses, in conjunction with additional data concerning an enterprise's network topology; gateway firewall programming; internal firewall configuration; directory services protocols and configuration; and permissions profiles for both users and for access to sensitive information, just to list a few non-exclusive examples may then be analyzed further within the automated planning service module 130, where machine learning techniques which include but are not limited to information theory statistics 130*a* may be employed and the action outcome simulation module 125, specialized for predictive simulation of outcome based on current data 125*a* may be applied to formulate a current, up-to-date and continuously evolving baseline network usage profile 202. This same data would be combined with up-to-date known cyberattack methodology reports, possibly retrieved from several divergent and exogenous sources through the use of the multi-application programming interface aware connector module 135 to present preventative recommendations to the enterprise decision makers for network infrastructure changes, physical and configuration-based to cost effectively reduce the probability of a cyberattack and to significantly and most cost effectively mitigate data exposure and loss in the event of attack 203, 204.

While some of these options may have been partially available as piecemeal solutions in the past, we believe the ability to intelligently integrate the large volume of data from a plurality of sources on an ongoing basis followed by predictive simulation and analysis of outcome based upon that current data such that actionable, business practice efficient recommendations can be presented is both novel and necessary in this field.

Once a comprehensive baseline profile of network usage using all available network traffic data has been formulated, the specifically tasked business operating system continuously polls the incoming traffic data for activities anomalous to that baseline as determined by pre-designated boundaries 205. Examples of anomalous activities may include a user attempting to gain access several workstations or servers in rapid succession, or a user attempting to gain access to a domain server of server with sensitive information using random userIDs or another user's userID and password, or attempts by any user to brute force crack a privileged user's password, or replay of recently issued ACTIVE DIRECTORY™/Kerberos ticket granting tickets, or the presence on any known, ongoing exploit on the network or the introduction of known malware to the network, just to name a very small sample of the cyberattack profiles known to those skilled in the field. The invention, being predictive as well as aware of known exploits is designed to analyze any anomalous network behavior, formulate probable outcomes of the behavior, and to then issue any needed alerts regardless of whether the attack follows a published exploit specification or exhibits novel characteristics deviant to normal network practice. Once a probable cyberattack is detected, the system then is designed to get needed information to responding parties 206 tailored, where possible, to each role in mitigating the attack and damage arising from it 207. This may include the exact subset of information included in alerts and updates and the format in which the information is presented which may be through the enterprise's existing security information and event management system. Network administrators, then, might receive information such as but not limited to where on the network the attack is believed to have originated, what systems are believed currently affected, predictive information on where the attack may progress, what enterprise information is at risk and actionable recommendations on repelling the intrusion and mitigating the damage, whereas a chief information security officer may receive alert including but not limited to a timeline of the cyberattack, the services and information believed compromised, what action, if any has been taken to mitigate the attack, a prediction of how the attack may unfold and the recommendations given to control and repel the attack 207, although all parties may access any network and cyberattack information for which they have granted access at any time, unless compromise is suspected. Other specifically tailored updates may be issued by the system 206, 207.

Figure 3A:
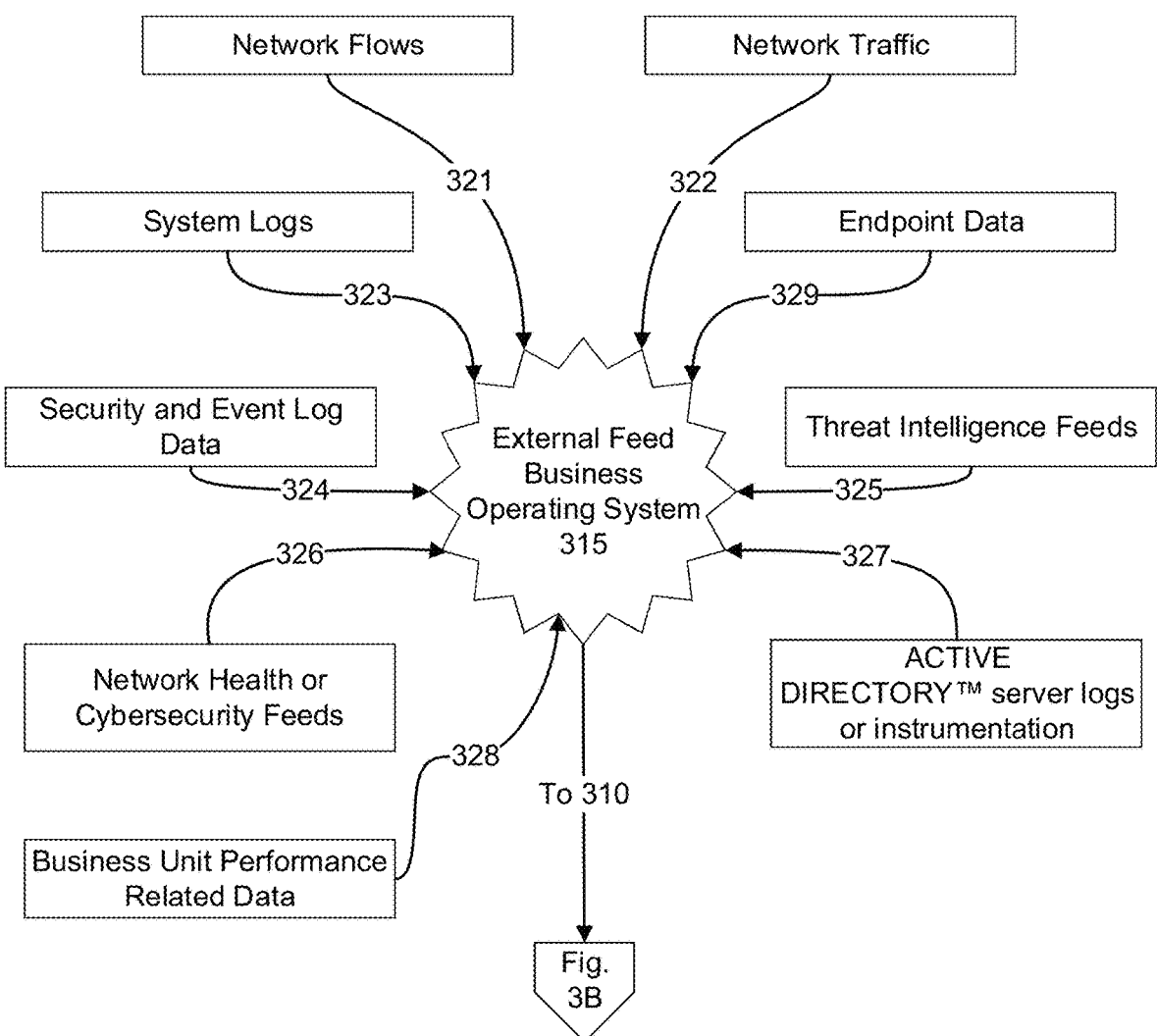

FIGS. 3A and 3B are a process diagram showing a general flow 300 of business operating system functions in use to mitigate cyberattacks. Input network data which may include network flow patterns 321, the origin and destination of each piece of measurable network traffic 322, system logs from servers and workstations on the network 323, endpoint data 329, any security event log data from servers or available security information and event (SIEM) systems 324, external threat intelligence feeds 324*a*, identity or assessment context 325, external network health or cyber-security feeds 326, Kerberos domain controller or ACTIVE DIRECTORY™ server logs or instrumentation 327 and business unit performance related data 328, among many other possible data types for which the invention was designed to analyze and integrate, may pass into 315 the business operating system 310 for analysis as part of its cyber security function. These multiple types of data from a plurality of sources may be transformed for analysis 311, 312 using at least one of the specialized cybersecurity, risk assessment or common functions of the business operating system in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the business operating system's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, perform one time or continuous vulnerability scanning depending on client directives 367, thwart cyberattacks and mitigate damage 368. These examples are, of course, only a subset of the possible uses of the system, they are exemplary in nature and do not reflect any boundaries in the capabilities of the invention.

Detailed Description of Exemplary Aspects

Figure 4:
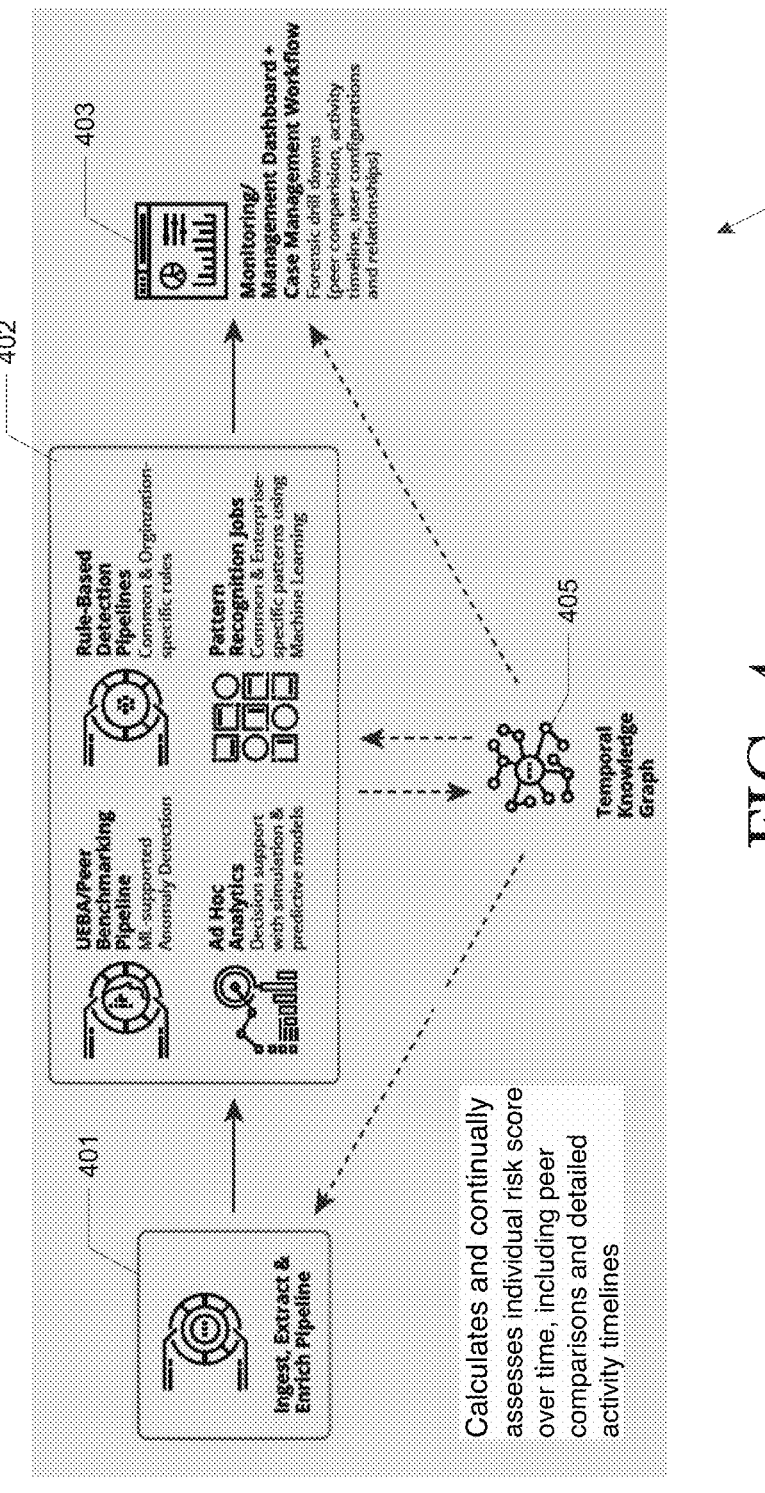
FIG. 4 is an architecture diagram illustrating an exemplary system 400 for automated analysis of legal documents within and across different fields, according to aspect.

FIG. 4 is an architecture diagram illustrating an exemplary system 400 for automated analysis of legal documents within and across different fields, according to aspect. System 400 provides a scalable and extensible framework for addressing the fragmented, but typically hierarchical, nature of these increasingly specialized uses of legal and technical language intermixed inside contract documents, patents, employment agreements and other common documents (e.g. transactional documents associated with M&A or investment activity). Legal documents are received and processed by input module 401. This module 401 ingest all documents to be processed into a format that us used throughout the system 400. Data may be received from a variety of different data sources containing data useful in interpreting the legal documents. The input module 401 also extracts all relevant data using natural language processing (NLP) processing pipelines. To properly prepare the data for analysis, input module 401 deduplicated the data to reduce dataset size and streamline it for future processing. This deduplication involves leveraging various mathematical formalisms and NLP algorithms for unstructured data to recognize and remove redundant information. The processed data is stored in a model 405 optimized for querying and analysis, such as a graph, time series, index, relation, or key-value store. For example, a block of text will be broken up and placed in rows in a table for faster processing but a highly relational data set may need to be in a graph to support efficient traversals.

Analysis engine 402 receives the data generated by the input module 401 to perform analysis processing on the data. Analysis engine 402 normalizes the data by converting various data types into a consistent unified data model. The data is associated with appropriate entities and that units or values are uniform, perhaps converting all temperatures to either Celsius or Fahrenheit or all time to the GMT time zone. This process further prepares the data for analysis with various predictive models, including machine learning algorithms. Depending on the use case, it can be performed either on streaming data as it is ingested or on batches of stored data.

The analysis engine 402 uses a standardized set of naming conventions or ontologies are applied to the data to ensure there is no confusion about the definitions of objects or values within the dataset. The process of indexing data points with their logical or linguistic meaning in the context of surrounding data points is referred to as semantifying data. Use of semantified data facilitates deeper reasoning and automated analysis of entities within the data and their relationships to one another.

Sometimes simple expressions and logic are enough to glean sufficient insight from this semantified data, but other times more advanced techniques involving various machine learning or deep learning approaches may be needed. For example, model-driven analysis extracts intended meaning and sentiment from widely varying sources of structured or unstructured data, allowing infusion or enrichment of the semantified data with even clearer meaning and greater context for increasingly improved automated processing and more insightful interpretation.

Analysis engine 402 uses the semantified data to build dynamic models 405 that enable better understanding, prediction, or simulation of the world. Additional self-improvement for models may leverage orchestration tools or reinforcement learning techniques to recognize and correct for model bias to continually maximize the accuracy and effectiveness of those models over time. Contextualized information can now be presented in a way that enables Human+AI collaboration to optimize decision-making and performance, at scale, to any domain.

Figure 6:
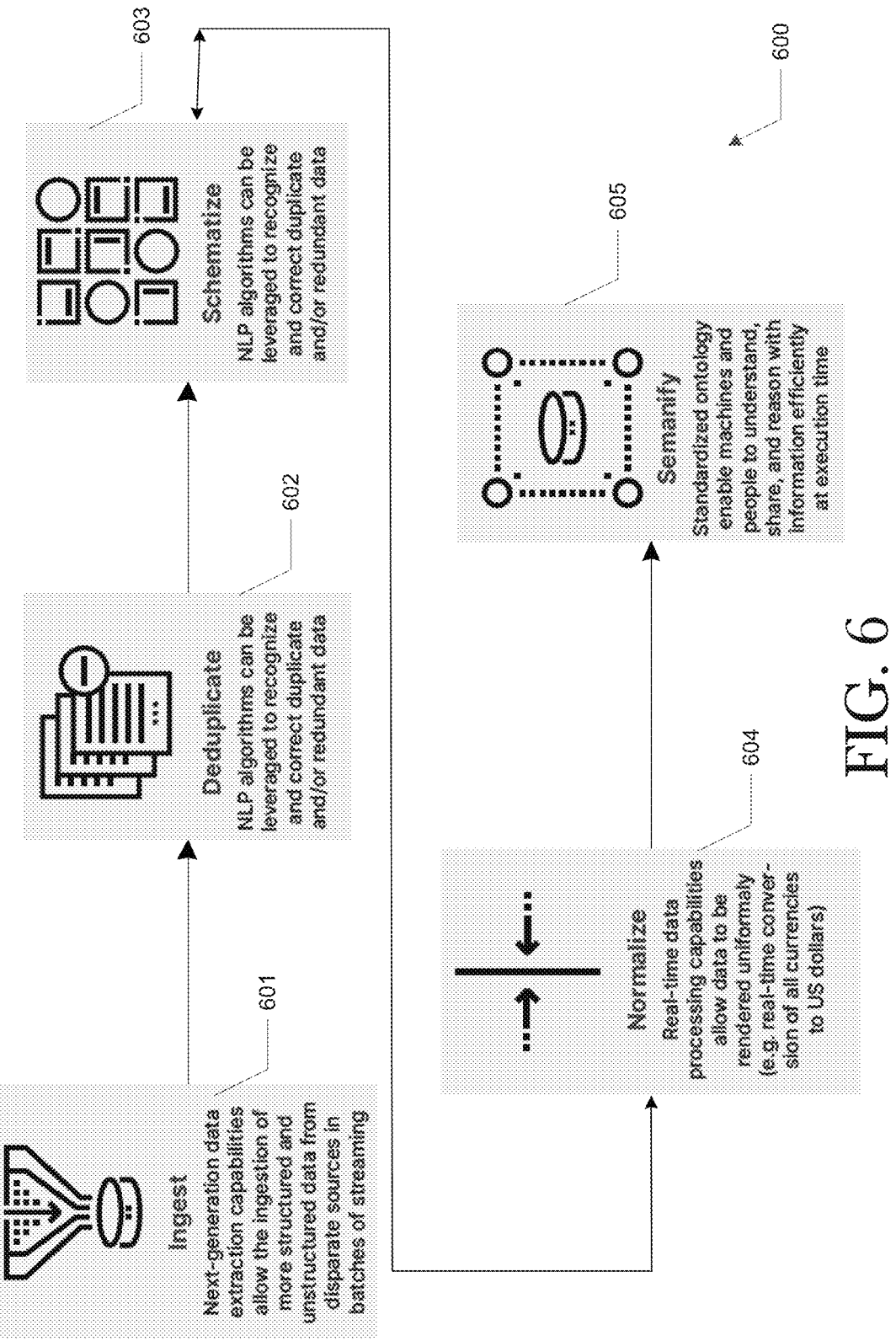
FIG. 6 is an architecture diagram illustrating an exemplary system 600 for automated analysis of legal documents within and across different fields, according to aspect.

This analysis processing is domain-agnostic, meaning the processing can be applied to virtually any structured or unstructured data set using Domain-Specific Languages (DSLs) and common data formalisms. FIG. 6 illustrates a process for performing this data input. The data is ingested 601 into the input module 401. The data may be deduplicated 602 to identify and correct duplicate and redundant information that exists in the raw input data. The input data may be schematized 603 to organize the data into a common framework. This data may be further processed 604 to normalize it into a common frame of reference for use when comparing data from differing sources. The initial processing is completed by semantifying the data into a standardized domain-specific ontology 605 enabling both machines and humans to understand, share, and reason with all of the data as a single entity.

By organizing data into a unified model 405 upon ingestion, the model 405 enables databases to evolve into knowledge bases where querying and analysis by monitoring module 403 is intuitive and efficient, even when reasoning about data from heterogeneous and disparate sources. Actual insights are delivered across data sources and not just a storage bill associated with a large but often unusable data lake. This module 403 is able to process logs and instrumented interactions at a massive scale to provide the immediate context needed to understand what is present within the legal. As a result, the monitoring module 403's process of decomposing both data and analytic work enables the delivery of visibility and detection capabilities that continually improve as more data is gradually collected and integrated.

This visibility supports understanding and predictive awareness useful when coupled with mathematical models and statistical analytics. This module 403 includes simulation modeling to explore what if scenarios and the use of other model management tools to improve predictive model performance and management. User's exploration of hypothetical strategies and outcomes with continuously enriched allows for better understand the intricacies of their entire legal position from the adoption and/or used of the legal documents. This analysis may be useful in preparing and negotiating legal agreements given complex interdependencies that would otherwise be very difficult to recognize or comprehend. This analysis may also be useful in determining whether a legal claim is either strong or weak when the legal documents are litigated. This processing may continue as new data from court opinions, litigation results, additional negotiations and similar events provides data relevant to the analysis.

Figure 5:
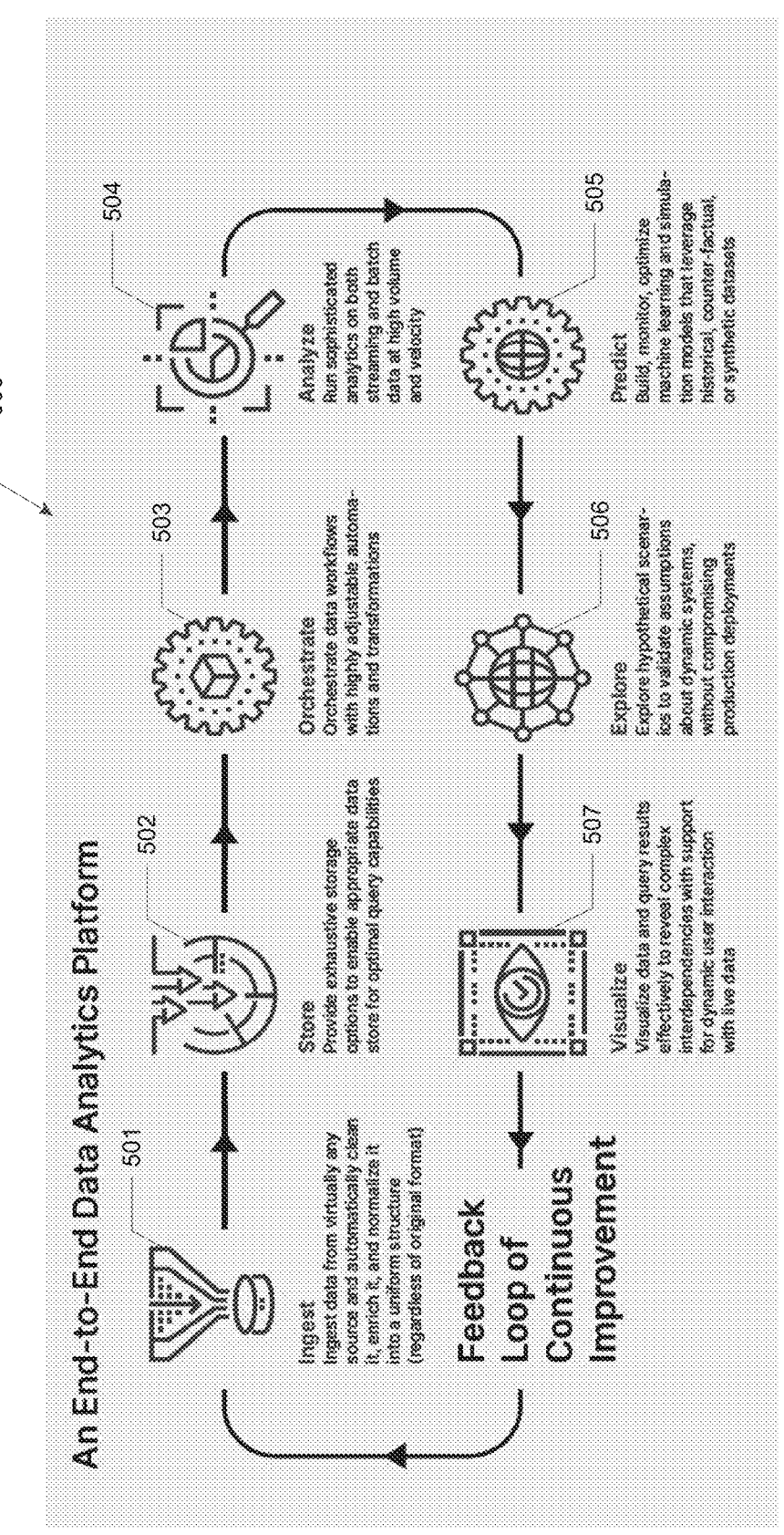
FIG. 5 is an architecture diagram illustrating an exemplary system 500 for automated analysis of legal documents within and across different fields, according to aspect.

FIG. 5 is an architecture diagram illustrating an exemplary process 500 for automated analysis of legal documents within and across different fields, according to aspect. An entire feedback loop of analysis steps is supported by an analytics processing system 400. Initial data is received and ingested 501 in which it is processed and formatted into a common framework for consideration within ongoing analysis. All of the data is stored 502 into any number of different datastores for use by the analysis processing.

Stored data may be orchestrated 503 into different automated workflows and varying transformations as users explore the data. This user exploration uses analysis processing 504 that generates various analytics using the common set of data from multiple sources. Once some analysis has been done, the data may be used to predict 505 outcomes from various simulations using historical, counter-factual, and synthetic data sources.

Users may use all the above results to explore 506 additional hypothetical scenarios to validate assumption about dynamic systems that would otherwise be difficult to measure. The user may visualize 507 the results from all of the analysis, predictions, and explorations into a common set of results as users identify complex interdependencies in the data from the multitude of sources.

Figure 7A:
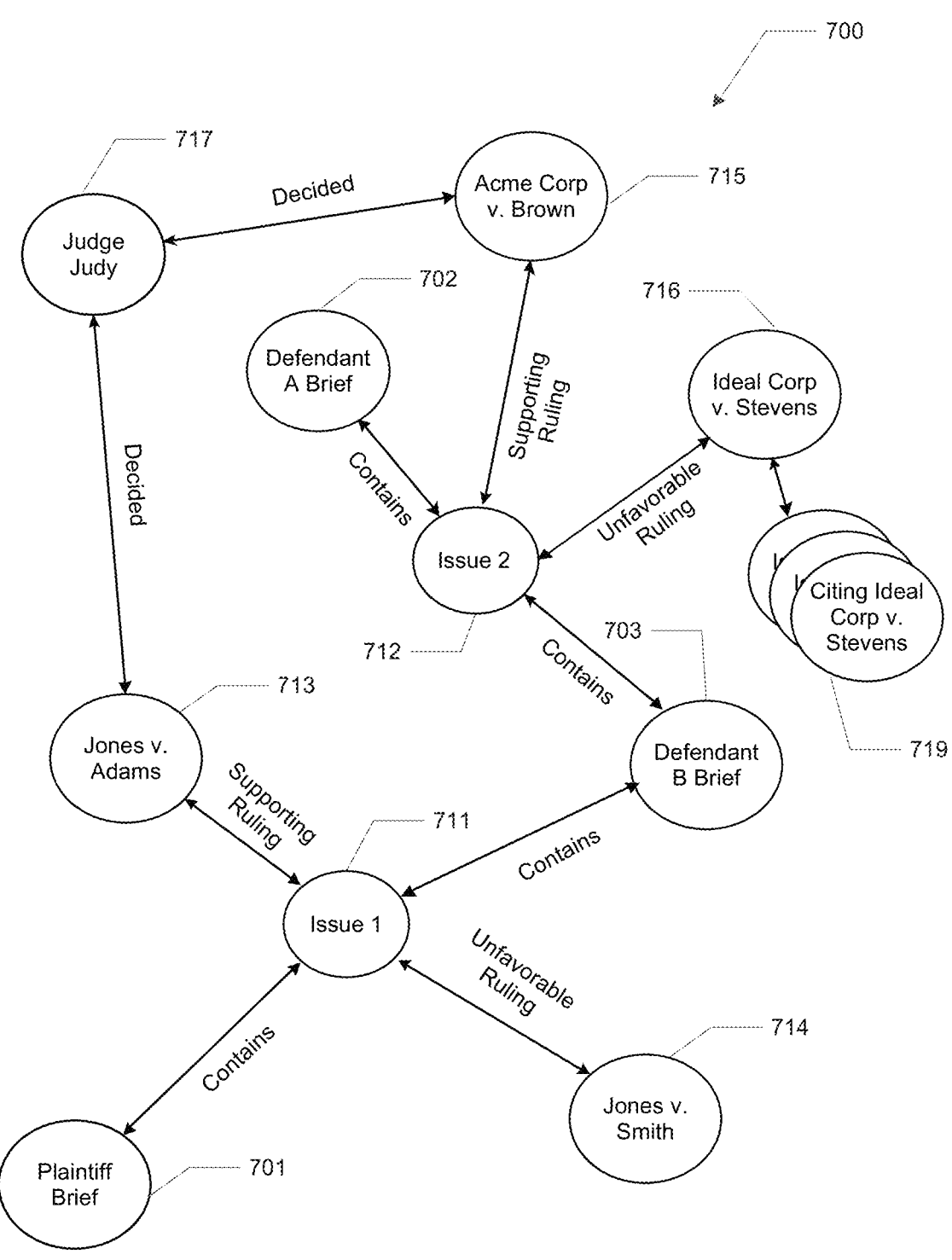
FIG. 7A-7C illustrate exemplary knowledge graphs for legal document analysis according to one aspect of the present invention.
Figure 7B:
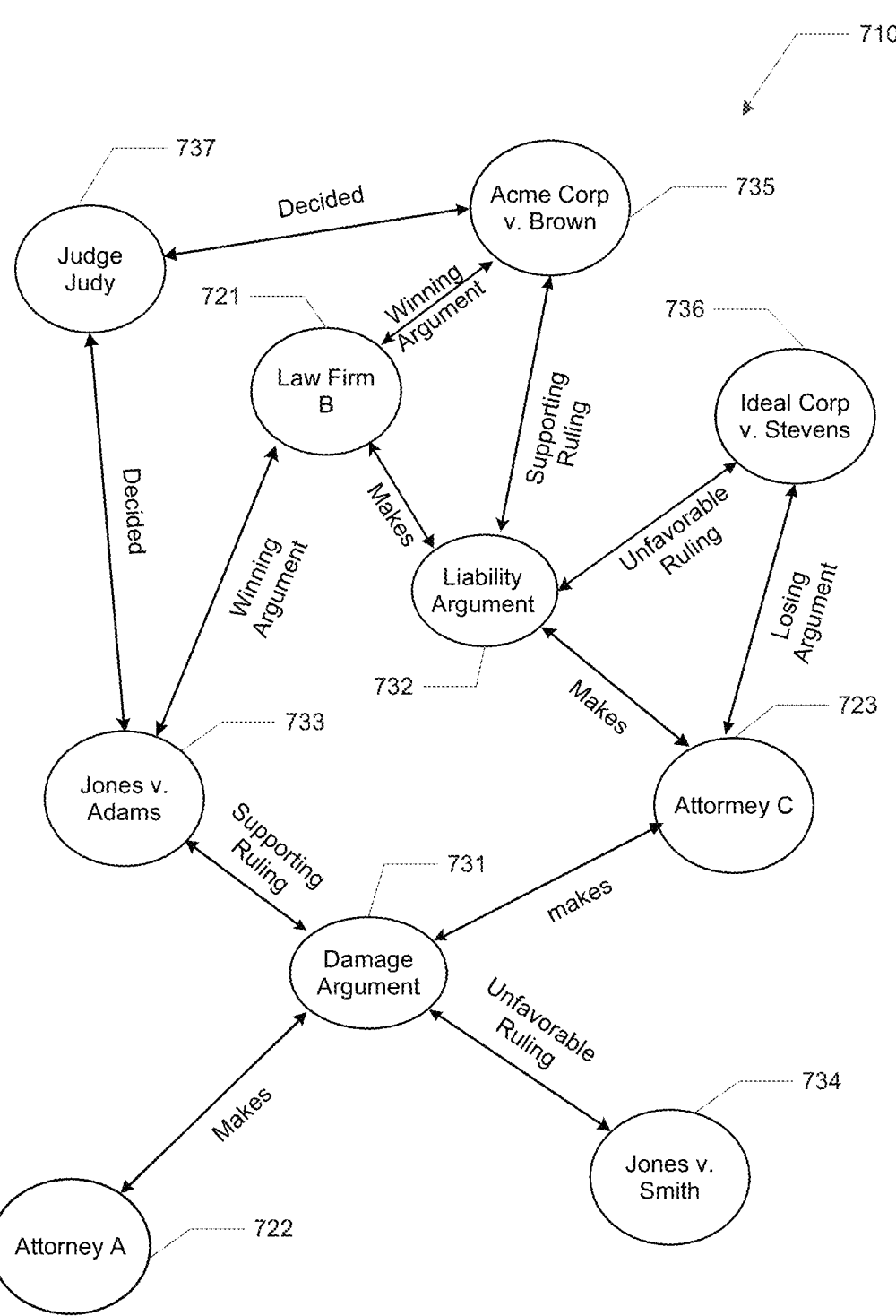
Figure 7C:
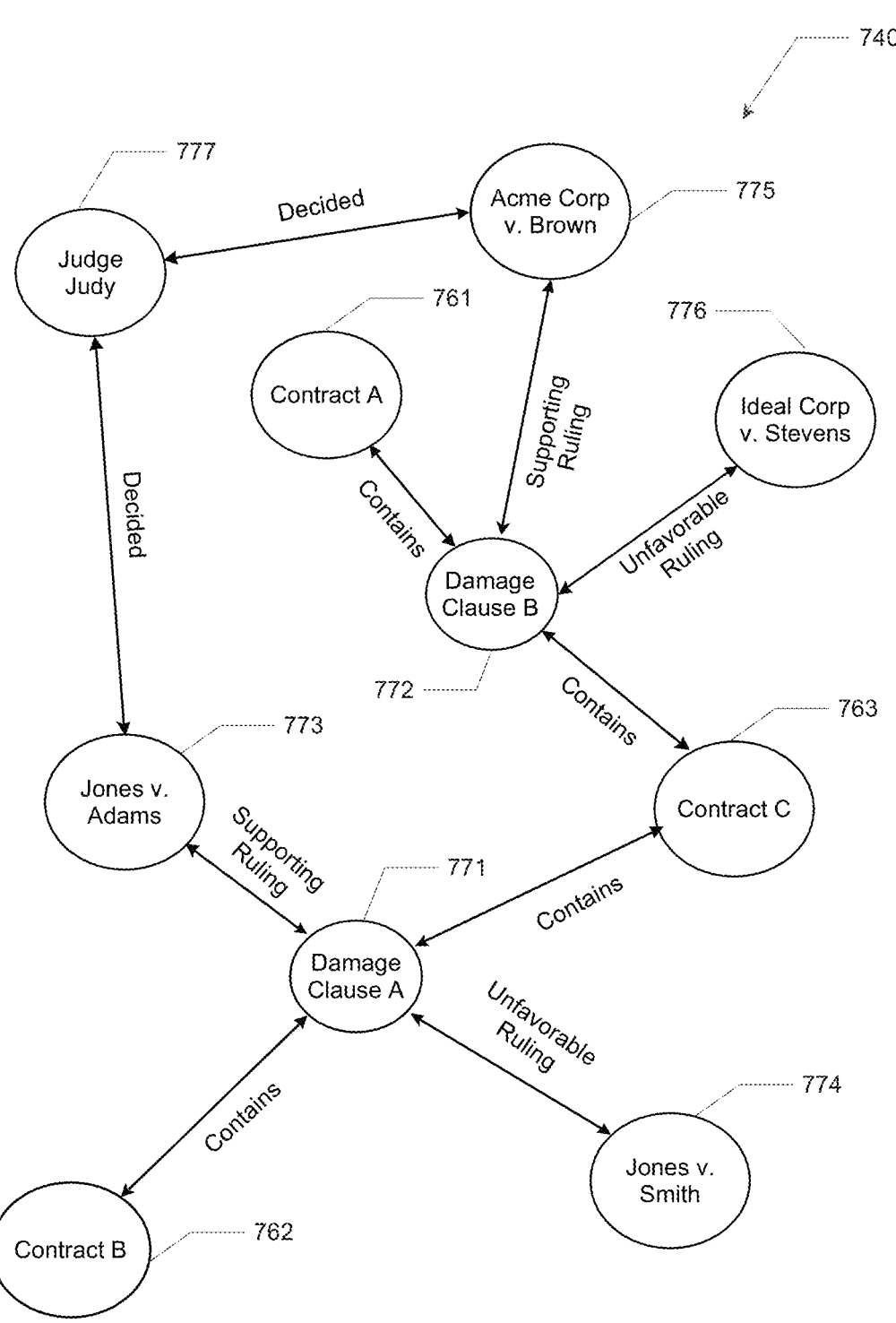

FIG. 7A-7C illustrate exemplary knowledge graphs for legal document analysis according to one aspect of the present invention. This analysis processing 400 may be used in several example analysis modeling. FIG. 7A illustrates one example knowledge graph. Legal briefs 701, 702, 703 filed is a case by all parties, or legal briefs from all cases on the same claim 711, 712, can be analyzed against each other, and the relative strength and weaknesses of the cited caselaw can be determined. The briefs themselves 701, 702, 703 provide one set of relevant data, caselaw opinions 713-716 provide standards to be applied and competing cases, can be compared to the facts at issue to estimate any strength or weakness in the arguments presented. For example, a cited case 713 can have its opinion compared against the decisions of all subsequent cases 719, 714, 715 that cite the asserted opinion 713. The facts described in these cases can be compared against the facts outlined in the briefs. The analysis may be performed with finds of fact for issues in dispute resolved in all possible ways to provide predictive outcomes in all of these possible scenarios. Such analysis by each party permits each to develop responses to the strongest points of opposing parties, and when performed before a responsive brief is filed permit drafting of arguments that best overcomes the opponents' case. The identity of a judge 717 that rules in the current case or in prior decisions may also be tracked to determine whether a favorable decision may be expected.

FIG. 7B illustrates another example knowledge graph in which this same data may be applied to similar cases that use differing law firms or that form the basis of selecting a law firm by a client. Analysis of the arguments made by a particular law firm 721, or a particular lawyer 722-723 in similar cases may provide a mechanism to identify the attorneys 722-723 who present the strongest arguments separate from the rulings 736 made in a case, or an argument that has mixed results 732, 731. The results of an action, motion, or the like depends upon the facts and witnesses as well as the arguments made by counsel 732, 731. The stronger work product and arguments may be made by attorneys for clients who do not prevail because of a weak factual situation. Hiring the best attorney for a case, or understanding the abilities of opposing counsel, can help clients resolve cases of all types to better negotiated resolutions. A particular judge who ruled over relevant cases may also be examined 737 for the purposes of determining the sorts of arguments and cases a given judge that may be relevant to a current case has ruled on, and how those rulings ended.

Inherent in both of the about uses of this NLP analysis is the analysis of the best legal arguments that may be made for a given set of facts. FIG. 7B illustrates one such use of an exemplary knowledge graph. Thus, attorneys performing legal research in support of development of a litigation or negotiation strategy may analyze relevant caselaw 733-736 to identify the strongest approach. Fact comparison of current facts and ones found in various opinions may result in identification of specific factual circumstances that permit a particular opinion to be applicable or distinguishable that may not be as readily apparent upon an initial reading of an opinion. All relationships of facts to opinions can be readily explored when the data is analyzed and represented by a knowledge graph of the present invention.

FIG. 7C illustrates one example knowledge graph in which analysis of contracts 761, 763, insurance policies, and similar agreements of all types that may be processed as part of any negotiation process. If the universe of available agreements is large enough, facts related to litigation 773, 774, 775, 776 over various provisions within the agreement 771-772, may be present and permit identification of the facts and circumstances that gave rise to a dispute. From the knowledge of the relevant facts, parties can determine how likely such facts arising may be, and whether other approaches may mitigate the risk of an adverse result be identified or adopted, such as a judge's ruling on related cases 777. This type of predictive analysis uses data beyond just the agreement language but benefits from consideration of many diverse data sources that would be otherwise difficult to analyze.

The examples within FIG. 7A-7C are simplified to emphasize the points described herein, these various graphs 700, 710, 740 may be smaller subsets of a larger and more complex graph as a large universe of facts and legal documents are entered into the system. Any other relationships between the disputes, agreements, parties, attorneys and the like may be separately explored as part of an analysis activity. In such analysis, many hard to otherwise identify relationships may be discovered that are relevant to a case at hand.

Figure 8:
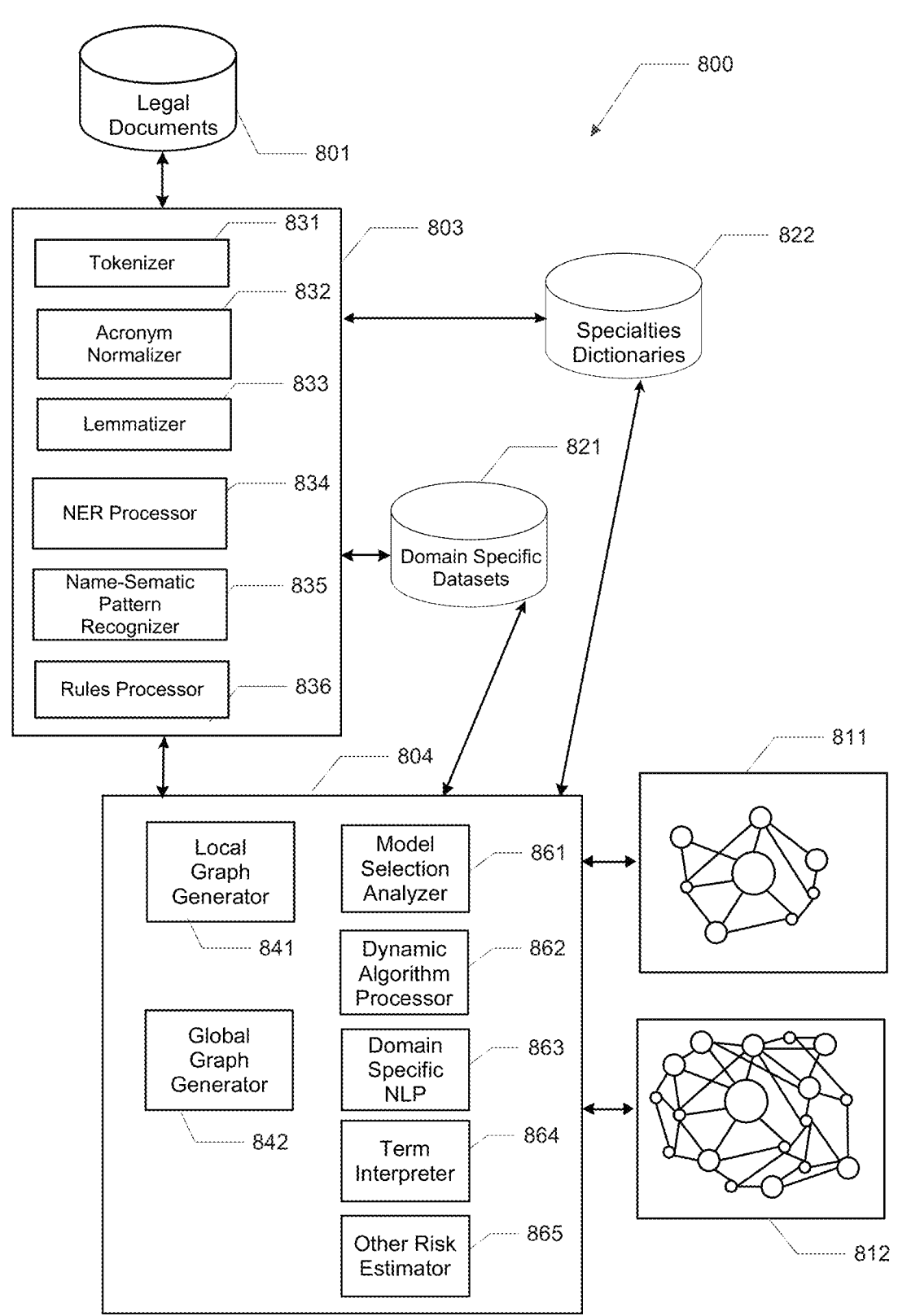
FIG. 8 is an architecture diagram illustrating an exemplary system 700 for automated analysis of legal documents within and across different fields, according to aspect.

FIG. 8 is an architecture diagram illustrating an exemplary system 800 for automated analysis of legal documents within and across different fields, according to aspect. System 800 includes two main functions: a hierarchical extraction and semantification processor 803 to identify, extract knowledge from data contained in legal documents 801 and transform it into a common data form and an analyzer 804 a development of the local 811 and global knowledge graphs 812 containing the key entities, relationships and concepts encoded in the text.

Extraction processor 803 performs a set of systematic NLP-based data extraction single-purpose generic micro-functions including Tokenizer 831, Acronym Normalizer 832, Lemmatizer 833, Name Entity Recognizer (NER) 834, pattern recognizer 836, and a rules processor 836. Tokenizer 831, given a character sequence and a defined document unit, tokenizes the character sequence up into pieces, called tokens, and possibly, at the same time, throwing away certain characters, such as punctuation. Acronym Normalizer 832 transforms all acronyms found in the incoming legal documents into standard set of terms applicable to all of the data regardless of source. Lemmatizer 833 transforming language within the documents to properly use a vocabulary and morphological analysis of words, normally aiming to remove inflectional endings only, and to return the base or dictionary form of a word. Name Entity Recognizer (NER) 834 identifies references to known people and entities within the documents, regardless of the form of the name. For example, reference to IBM or Apple and IBM Corp. and Apple Inc. will identified as referring to the same respective entities. Similar variations in references to an individual's name, including use or omission of middle initials or Jr. Pattern recognizer 835 performs other structured term-extraction features to document-wide semantic NLP pattern recognition macro-functions including sentiment and topic extraction, as well as targeted word/sentence clustering and information retrieval. Rules processor 836 performs system and user defined data transformation and orchestration workflows.

The results of hierarchical extraction and semantification processor 803 allow a model selection analyzer 861, within analysis processor 804, to perform dynamic model selection based on a series of more efficient classification types of algorithms which look at estimating the domain, age, legal jurisdictions, etc. . . . associated with a document and applying relevant NER, gazetteers, and ontologies. This dynamic model selection enables a dynamic algorithm processor 762 to effectively query a catalogue of available models 821 and recommend an available model to best extract, parse, interpret, schematize, normalize and then semantify the data as discussed above in FIG. 6 with a specialized natural language processor 863, term interpreter 864, and risk estimator 865. The recommended model may have been trained already or is dynamically trained on available source data and labels.

Domain specific NLP processor 863 may feed legal and domain-specific technical data into workflows for both knowledge graph enrichment and dataset contextualization, together with a local and global graph generator 841, 842. Such graph generators 841, 842 take data and the results of processes done by other components in an analysis processor 861-865 and may produce localized knowledge graphs for specific groups of data, or global graphs for wider ranges of data and graph-edges. These processes are only possible by using NLP-based tagging and mapping capabilities to provide a bridge between raw/semi-processed datasets and context-aware graph ontologies. Ultimately, the analysis processor 804 continuously enhance these knowledge bases through feedback loops with new data from systematic events, so that the development of local 811 and global knowledge graphs 812 can be both informed by, and inform, the extraction and analysis processes.

System 800 leverages the hierarchical extraction and semantification processor 803 to map raw legal document data to our domain specific languages (DSL). Use of the DSLs allows for capturing individual different levels of granularity in the knowledge graphs 811-812 within specific investment products in legal, finance, or multi-level risk insurance policies. Within these DSLs, and at each of these levels, the analysis processor 804 tags individual clauses or terms with contextual information, and flags problematic terms according to both endogenous ambiguity where historical information or legal precedent isn't accessible or existent, as well as exogenous risk dimensions that are specific to these industries.

Domain-language ambiguity is addressed by establishing an array of more clear-cut interpretations of that vague clause, using likelihood values that estimate a valuation distribution based on the document's language. Specific dictionaries 822 for each legal specialty provide additional data and term definition for use in processing any particular legal document. System 800 captures systemic risk changes through time-varying pattern analysis where the system can map a cross-sectional snapshot of the current state of the system's events, be it natural catastrophe incidents, political & market sentiment or regulatory and macro-prudential policy changes, to the clause or term affecting the valuation/pricing of a given product/policy. These approaches explore the state space of pricing/valuation possibilities with a dimensionality beyond what individual agents can scale to, utilizing rule-based thresholds to make efficient use of human capital to review a targeted subset of valuation or loss estimation results.

FIG. 9 is a flowchart diagram illustrating an exemplary method 900 for automated analysis of legal documents within and across different fields, according to aspect. The method begins with step 901 receiving a data set of legal documents. Step 902 identifies and extracts a set of knowledge data from data contained in the legal document. The knowledge data is transformed by step 903 into a common data form. Step 904 selects a dynamic model used in estimating a domain, age, and legal jurisdictions for the knowledge data and step 905 queries a catalogue of available models.

A knowledge graph is generated from the knowledge data by step 906, Step 907 performs knowledge graph enrichment and dataset contextualization using legal and domain-specific technical data. The method concludes with step 908 providing one or more interpretations for a provision within the knowledge data.

FIG. 10 is a flowchart diagram illustrating an exemplary method 1000 for automated analysis of legal documents within and across different fields, according to aspect. Step 1001 tokenizes a character sequence up into pieces, and throwing away characters, such as punctuation. Step 1002 transforms all acronyms found in the incoming legal documents into standard set of terms applicable to all of the data regardless of source. Language within the knowledge data is transformed by step 1003 to properly use a vocabulary and morphological analysis of words.

Step 1004 identifies references to known people and entities within the documents, regardless of a form of the reference. Step 1005 performed pattern recognition on the knowledge data including sentiment and topic extraction, targeted word/sentence clustering, and information retrieval. Step 1006 applies system and user defined data transformation and orchestration workflows.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 11:
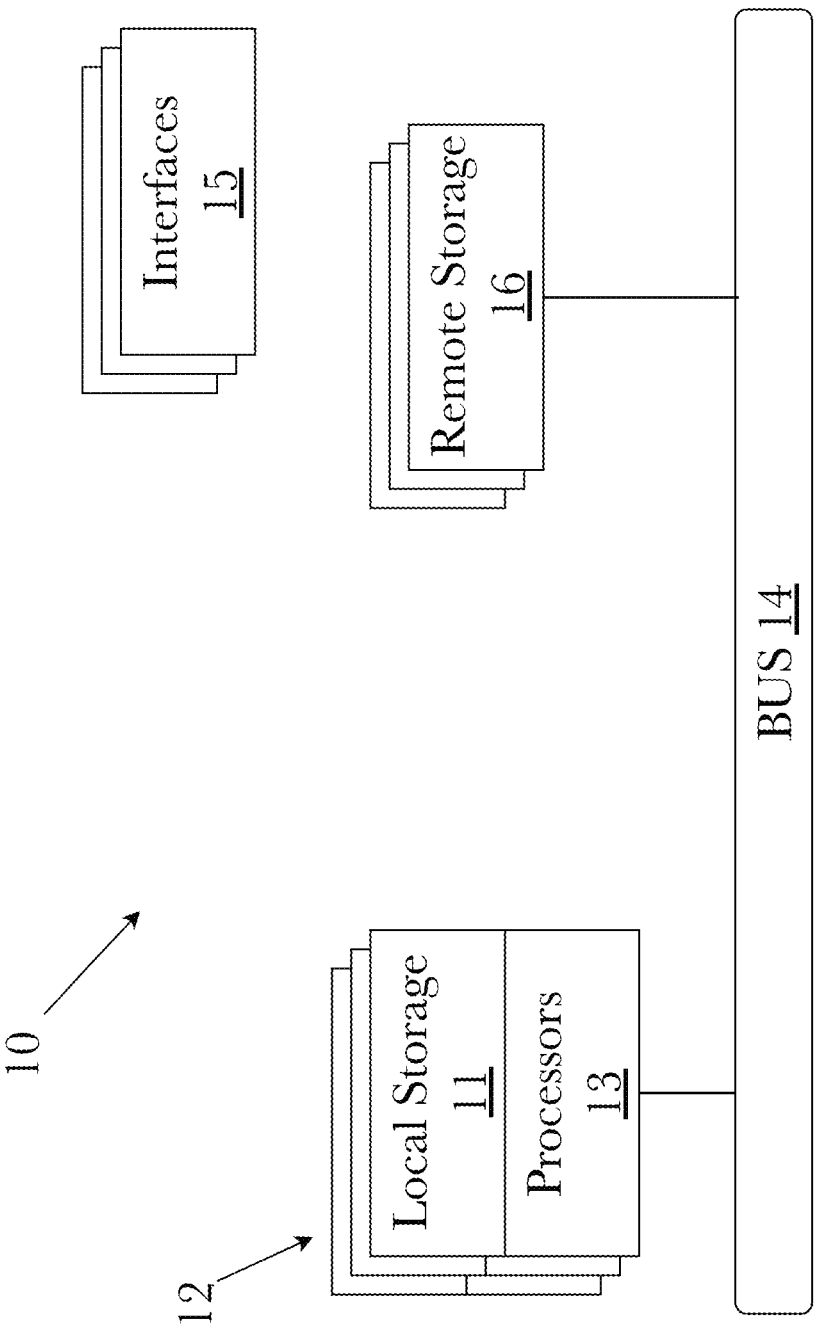
FIG. 11 is a block diagram illustrating an exemplary hardware architecture of a computing device.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 May be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 May be responsible for implementing specific functions associated with the functions of a specifically configured computing device or machine. For example, in at least one aspect, a computing device 10 May be configured or designed to function as a server system utilizing CPU 12, local memory 11 and/or remote memory 16, and interface(s) 15. In at least one aspect, CPU 12 May be caused to perform one or more of the different types of functions and/or operations under the control of software modules or components, which for example, may include an operating system and any appropriate applications software, drivers, and the like. CPU 12 May include one or more processors 13 such as, for example, a processor from one of the Intel, ARM, Qualcomm, and AMD families of microprocessors. In some aspects, processors 13 May include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 May be used for a variety of purposes such as, for example, caching and/or storing data, programming instructions, and the like. It should be further appreciated that CPU 12 May be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 May for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FD-DIs), and the like. Generally, such interfaces 15 May include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the aspects described herein, it is by no means the only device architecture on which at least a portion of the features and techniques described herein may be implemented. For example, architectures having one or any number of processors 13 May be used, and such processors 13 May be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
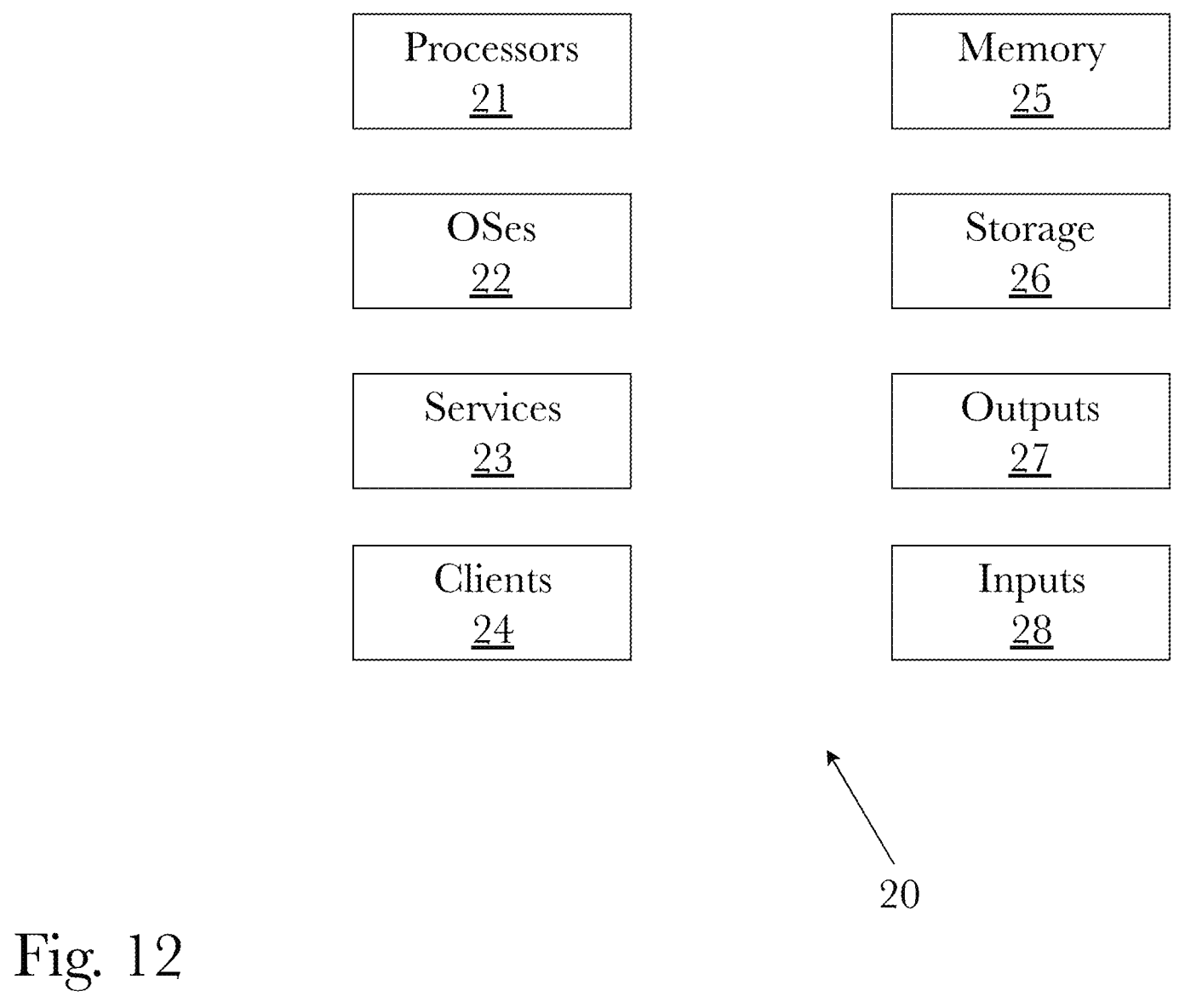

In some aspects, systems may be implemented on a standalone computing system. Referring now to FIG. 12, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 May be operable in system 20, and may be useful for providing common services to client applications 24. Services 23 May for example be WINDOWS™ services, user-space common services in a Linux environment, or any other type of common service architecture used with operating system 21. Input devices 28 May be of any type suitable for receiving user input, including for example a keyboard, touchscreen, microphone (for example, for voice input), mouse, touchpad, trackball, or any combination thereof. Output devices 27 May be of any type suitable for providing output to one or more users, whether remote or local to system 20, and may include for example one or more screens for visual output, speakers, printers, or any combination thereof. Memory 25 May be random-access memory having any structure and architecture known in the art, for use by processors 21, for example to run software. Storage devices 26 May be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
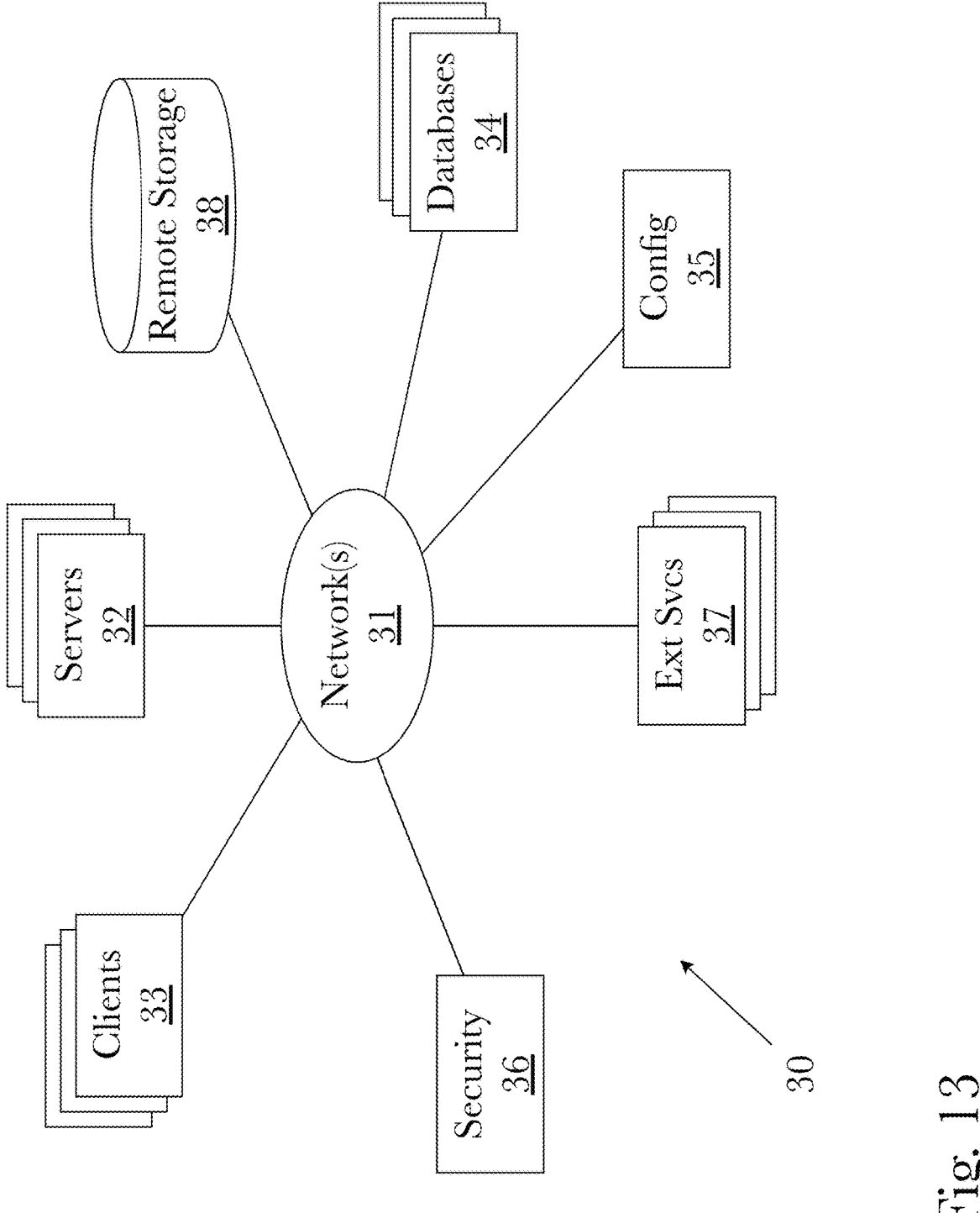
FIG. 13 is a block diagram showing an exemplary architectural arrangement of clients, servers, and external services.

In some aspects, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 May be provided. Each client 33 May run software for implementing client-side portions of a system; clients may comprise a system 20 such as that illustrated in FIG. 12. In addition, any number of servers 32 May be provided for handling requests received from one or more clients 33. Clients 33 and servers 32 May communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 May be implemented using any known network protocols, including for example wired and/or wireless protocols.

In addition, in some aspects, servers 32 May call external services 37 when needed to obtain additional information, or to refer to additional data concerning a particular call. Communications with external services 37 May take place, for example, via one or more networks 31. In various aspects, external services 37 May comprise web-enabled services or functionality related to or installed on the hardware device itself. For example, in one aspect where client applications 24 are implemented on a smartphone or other electronic device, client applications 24 May obtain information stored in a server system 32 in the cloud or on an external service 37 deployed on one or more of a particular enterprise's or user's premises. In addition to local storage on servers 32, remote storage 38 May be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 May be used or referred to by one or more aspects. It should be understood by one having ordinary skill in the art that databases in storage 34 May be arranged in a wide variety of architectures and using a wide variety of data access and manipulation means. For example, in various aspects one or more databases in storage 34 May comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 14:
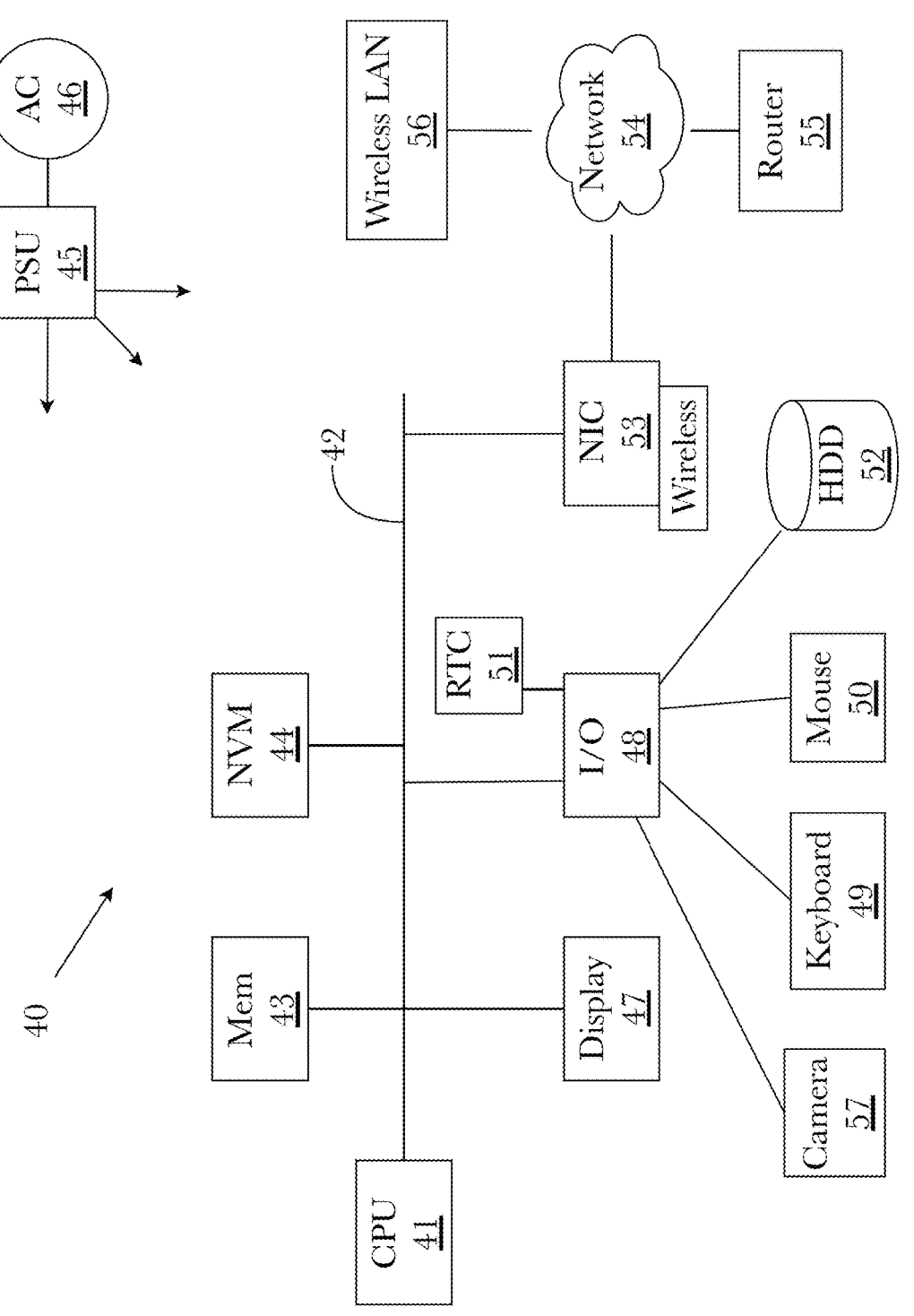
FIG. 14 is another block diagram illustrating an exemplary hardware architecture of a computing device.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 May, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A computer system for automated analysis of legal documents within and across different fields employing a cyber decision platform, wherein the computer system is configured to execute software instructions stored on a nontransitory machine-readable storage media, the computer system comprising:

one or more hardware processors configured for:

receiving a data set containing documents including legal documents, technical documents, and domain-specific documents from multiple jurisdictions and practice areas;

hierarchically classifying documents as legal or domain-specific to other fields including engineering, technology, cybersecurity and medicine, wherein legal documents are routed to legal-specific processing and non-legal documents are routed to domain-specific specialty models;

automatically classifying the legal documents by legal domain, jurisdictional framework, and temporal context using machine learning classification algorithms;

performing dynamic model selection of one or more models from a curated model catalogue of domain-specific natural language processing (NLP) models based on the classification, wherein the domain-specific NLP models are trained for specific specialties and jurisdictional requirements;

extracting legal entities including laws, regulations, cases, judgments, contracts, legal concepts, parties, jurisdictions, organizations, people, events, locations, and dates, contractual clauses, and precedential relationships from the received legal documents using the selected domain-specific NLP models;

generating jurisdiction-specific knowledge graphs that link legal concepts, case precedents, regulatory requirements, and contractual provisions with weighted relationship scores, wherein the knowledge graphs comprise:

nodes representing legal entities, contractual terms, statutory provisions, and case precedents;

edges representing legal relationships weighted by precedential strength and jurisdictional applicability; and temporal annotations tracking legal concept evolution and regulatory changes over time;

performing real-time knowledge graph enrichment using current legal developments, regulatory changes, and litigation outcomes; and providing predictive legal risk assessments and outcome probabilities for the received legal documents by:

querying the jurisdiction-specific knowledge graphs using the extracted legal entities and relationships from the received documents;

analyzing relevant case precedents and regulatory requirements identified in the knowledge graphs; and generating document-specific risk predictions based on historical litigation data and current legal trends integrated within the knowledge graphs.

2. The computer system of claim 1, wherein dynamic model selection comprises:

analyzing document metadata to determine legal practice area from a predefined taxonomy of legal specialties;

identifying jurisdictional markers including court references, statutory citations, and regulatory framework indicators;

selecting specialized legal NLP models trained on domain-specific legal corpora; and applying jurisdiction-specific legal ontologies and terminologies to normalize extracted legal concepts.

3. The computer system of claim 1, wherein the jurisdiction-specific knowledge graphs comprise:

nodes representing legal entities, contractual terms, statutory provisions, and case precedents;

edges representing legal relationships weighted by precedential strength and jurisdictional applicability; and temporal annotations tracking legal concept evolution and regulatory changes over time.

4. The computer system of claim 1, wherein generating jurisdiction specific-knowledge graphs further comprises:

applying reinforcement learning algorithms to optimize knowledge graph entity classification and relationship placement based on prediction accuracy feedback from the predictive legal risk assessments; and continuously refining knowledge graph structure through iterative learning processes that improve legal entity relationship accuracy over time.

5. The computer system of claim 4, wherein the reinforcement learning algorithms incorporate human feedback from legal experts, users, and crowd-sourced annotations to improve knowledge graph structure and legal entity relationships through reinforcement learning from human feedback (RLHF).

6. The computer system of claim 1, further comprising:

generating system recommendations for relevant cases, expert content, legal decisions, findings, and research papers using reinforcement learning algorithms trained on user interaction patterns and expert feedback;

applying reinforcement learning from human feedback to refine link suggestions and relationship determinations within the knowledge graphs; and providing contextual recommendations based on the jurisdiction-specific knowledge graphs and current legal document analysis.

7. The computer system of claim 1, wherein the jurisdiction-specific knowledge graphs include temporal enhancements comprising:

time-weighted relationship scores that decay based on legal precedent age and current relevance;

temporal clustering of legal concepts to track regulatory evolution patterns;

dynamic updating of legal relationship strengths based on recent case outcomes and regulatory changes;

historical versioning of legal knowledge graph states to enable temporal legal analysis.

8. The computer system of claim 1, wherein hierarchical classification further comprises:

accessing specialty dictionaries for non-legal domains including engineering, technology, cybersecurity, medicine, and other technical specialties;

applying domain-specific terminologies and ontologies for each identified specialty field;

routing cross-domain documents to hybrid processing pipelines that combine legal and technical domain expertise; and generating cross-domain knowledge graphs that link legal concepts with technical domain concepts for comprehensive analysis.

9. The computer system of claim 1, wherein knowledge graph enrichment comprises:

implementing hierarchical extraction and analysis processes analogous to GraphRAG approaches when processing both a priori reference materials and new user query inputs;

generating community summaries of related legal concepts analogous to local graph clusters for focused analysis;

maintaining both local knowledge graphs for document-specific analysis and global knowledge graphs for comprehensive legal domain coverage;

applying lazy evaluation techniques for efficient knowledge graph querying and dynamic expansion based on query requirements; and integrating community detection algorithms to identify legal concept clusters and relationship patterns within the jurisdiction-specific knowledge graphs.

10. The computer system of claim 1, wherein extracting legal entities further comprises:

identifying and extracting core legal entities including:

laws and regulations with hierarchical structure including sections and subsections;

cases and judgments including parties involved, rulings, and associated legal documents;

contracts including terms, clauses, and obligations;

legal concepts including abstract legal principles and doctrines;

parties including individuals, organizations, and entities involved in legal matters;

jurisdictions including geographical areas where legal rules apply;

establishing relationships between entities including "applies to," "cited in," "involved in," "governs," and "is an example of" relationships; and weighting relationships based on legal precedential strength, jurisdictional authority, and temporal relevance.

11. The computer system of claim 1, wherein providing predictive legal risk assessments further comprises:

analyzing legal brief arguments and cited case law to determine relative strengths and weaknesses of legal positions;

performing fact pattern comparison between current documents and historical case outcomes;

tracking judicial decision patterns and preferences for outcome probability modeling;

identifying optimal legal strategies based on historical success rates in similar jurisdictional contexts; and generating confidence intervals for legal outcome predictions based on knowledge graph relationship strengths and historical litigation data patterns.

12. A computer-implemented method executed on a cyber decision platform for automated analysis of legal documents within and across different fields, the computer-implemented method comprising:

receiving a data set containing documents including legal documents, technical documents, and domain-specific documents from multiple jurisdictions and practice areas;

hierarchically classifying documents as legal or domain-specific to other fields including engineering, technology, cybersecurity, and medicine, wherein legal documents are routed to legal-specific processing and non-legal documents are routed to domain-specific specialty models;

automatically classifying the legal documents by legal domain, jurisdictional framework, and temporal context using machine learning classification algorithms;

performing dynamic model selection of one or more models from a curated model catalogue of domain-specific NLP models based on the classification, wherein the domain-specific NLP models are trained for specific legal specialties and jurisdictional requirements;

extracting legal entities including laws, regulations, cases, judgments, contracts, legal concepts, parties, jurisdictions, organizations, people, events, locations, and dates, contractual clauses, and precedential relationships from the received legal documents using the selected domain-specific NLP models;

generating jurisdiction-specific knowledge graphs that link legal concepts, case precedents, regulatory requirements, and contractual provisions with weighted relationship scores, wherein the knowledge graphs comprise:

nodes representing legal entities, contractual terms, statutory provisions, and case precedents;

edges representing legal relationships weighted by precedential strength and jurisdictional applicability; and temporal annotations tracking legal concept evolution and regulatory changes over time;

performing real-time knowledge graph enrichment using current legal developments, regulatory changes, and litigation outcomes; and providing predictive legal risk assessments and outcome probabilities for the received legal documents by:

querying the jurisdiction-specific knowledge graphs using the extracted legal entities and relationships from the received documents;

analyzing relevant case precedents and regulatory requirements identified in the knowledge graphs; and generating document-specific risk predictions based on historical litigation data and current legal trends integrated within the knowledge graphs.

13. The computer-implemented method of claim 12, further comprising:

continuously monitoring external legal data sources for regulatory changes and new case law;

automatically updating domain-specific NLP models based on emerging legal terminology and precedents;

recalculating legal risk assessments in response to detected legal developments; and generating automated alerts for legal positions affected by regulatory or jurisprudential changes.

14. The computer-implemented method of claim 12, wherein generating jurisdiction-specific knowledge graphs comprises:

identifying cross-jurisdictional legal concept equivalences and conflicts;

mapping legal precedents to applicable jurisdictional frameworks;

calculating precedential strength scores based on case citation frequency and judicial authority; and establishing temporal legal concept evolution pathways tracking regulatory and jurisprudential changes.

* * * * *